United States Patent
Bian et al.

(10) Patent No.: US 12,135,455 B2
(45) Date of Patent: Nov. 5, 2024

(54) PHOTONIC INTEGRATED CIRCUIT STRUCTURE WITH COUPLER FOR INTERLAYER WAVEGUIDE COUPLING

(71) Applicant: GlobalFoundries U.S. Inc., Malta, NY (US)

(72) Inventors: Yusheng Bian, Ballston Lake, NY (US); Kenneth J. Giewont, Hopewell Junction, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 241 days.

(21) Appl. No.: 17/723,608

(22) Filed: Apr. 19, 2022

(65) Prior Publication Data
US 2023/0333318 A1 Oct. 19, 2023

(51) Int. Cl.
*G02B 6/122* (2006.01)

(52) U.S. Cl.
CPC ......... *G02B 6/1225* (2013.01); *G02B 6/1228* (2013.01)

(58) Field of Classification Search
CPC .............................. G02B 6/1228; G02B 6/125
See application file for complete search history.

(56) References Cited

U.S. PATENT DOCUMENTS

| | | |
|---|---|---|
| 5,232,866 A | 8/1993 | Beyer et al. |
| 6,385,376 B1 * | 5/2002 | Bowers ............... G02B 6/125 385/16 |
| 8,722,508 B2 | 5/2014 | Botula et al. |
| 9,219,068 B2 | 12/2015 | Cheng et al. |
| 9,435,961 B2 * | 9/2016 | Jiang .................... G02B 6/124 |
| 10,429,582 B1 | 10/2019 | Bian et al. |
| 10,649,140 B1 | 5/2020 | Bian et al. |
| 10,746,921 B2 | 8/2020 | Bian et al. |
| 10,795,188 B2 | 10/2020 | Aflatouni et al. |
| 10,816,726 B1 | 10/2020 | Peng et al. |
| 10,989,876 B1 | 4/2021 | Peng et al. |

(Continued)

OTHER PUBLICATIONS

U.S. Appl. No. 17/709,841 Office Action dated Apr. 10, 2023, 11 pages.

(Continued)

*Primary Examiner* — Eric Wong
(74) *Attorney, Agent, or Firm* — Anthony Canale; Hoffman Warnick LLC

(57) ABSTRACT

Disclosed is a photonic integrated circuit (PIC) structure including a first waveguide core with a first end portion, a second waveguide core with a second end portion overlaying and physically separated from the first end portion, and a coupler configured to facilitate low-loss optical signal transmission between the waveguide cores. The coupler can include at least one array of photonic material elements (e.g., photonic crystal elements or photonic metamaterial elements) embedded in cladding material between the end portions. Alternatively, the coupler can include at least one photonic material layer (e.g., a photonic crystal layer or a photonic metamaterial layer) between and physically separated from the end portions and an array of cladding material elements extending through the photonic material layer. Also disclosed is a PIC structure including an on-chip system (e.g., a photonic computing system) including a crossing array implemented using any of the above-described couplers.

20 Claims, 18 Drawing Sheets

(56) References Cited

U.S. PATENT DOCUMENTS

| | | | |
|---|---|---|---|
| 11,467,468 B2* | 10/2022 | Vuckovic | G02F 1/313 |
| 2005/0047708 A1 | 3/2005 | Ma et al. | |
| 2012/0288229 A1 | 11/2012 | Doerr et al. | |
| 2014/0140655 A1* | 5/2014 | Chakravarty | G01N 21/7746 |
| | | | 385/12 |
| 2015/0247974 A1 | 9/2015 | Painchaud et al. | |
| 2016/0266321 A1 | 9/2016 | Tummidi et al. | |
| 2017/0212304 A1 | 7/2017 | Sacher et al. | |
| 2017/0254951 A1 | 9/2017 | Dumais et al. | |
| 2020/0012045 A1 | 1/2020 | Bian et al. | |
| 2021/0313259 A1* | 10/2021 | Lu | G02B 6/4214 |
| 2022/0326441 A1* | 10/2022 | Sapra | G02B 6/124 |
| 2023/0384540 A1* | 11/2023 | Huang | G02B 6/34 |

OTHER PUBLICATIONS

U.S. Appl. No. 17/709,841, Response to Office Action filed Jun. 12, 2023, 24 pages.

U.S. Appl. No. 17/709,841, Final Office Action dated Jul. 25, 2023, 11 pages.

Aboketaf et al., "Towards Fully Automated Testing and Characterization for Photonic Compact Modeling on 300-MM Wafer Platform," OSA 2021, pp. 1-3.

Bian et al., "3D Silicon Photonic Interconnects and Integrated Circuits Based on Phase Matching," IEEE 71st Electronic Components and Technology Conference (ECTC), 2021, pp. 2279-2284.

Bian et al., "Light Manipulation in a Monolithic Silicon Photonics Platform Leveraging 3D Coupling and Decoupling," Frontiers in Optics/Laser Science, OSA 2020, pp. 1-2.

Bian et al., "Monolithically Integrated Silicon Nitride Platform," OSA 2021, pp. 1-3.

Bian et al., "Towards Low-Loss Monolithic Silicon and Nitride Photonic Building Blocks in State-of-the-Art 300mm CMOS Foundry," Frontiers in Optics/Laser Science, OSA 2020, pp. 1-2.

Sacher et al., "Monolithically Integrated Multilayer Silicon Nitride-On-Silicon Waveguide Platforms for 3-D Photonic Circuits and Devices," Proceedings of the IEEE, vol. 106, No. 12, 2018, pp. 2232-2245.

Giewont et al., "300-mm Monolithic Silicon Photonics Foundry Technology," IEEE Journal of Selected Topics in Quantum Electronics, vol. 25, No. 5, 2019, pp. 1-12.

Rakowski et al., "45nm CMOS—Silicon Photonics Monolithic Technology (45CLO) for Next-Generation, Low Power and High Speed Optical Interconnects," OSA, 2020, pp. 1-3.

Shang et al., "Low-Loss Compact Multilayer Silicon Nitride Platform for 3D Photonic Integrated Circuits," OSA, 2015, pp. 1-9.

Sakai et al., "Low Loss Ultra-Small Branches in a Silicon Photonics Wire Waveguide," IEICE Trans. Electron, vol. E85-C, No. 4, 2002, pp. 1033-1038.

Sodagar et al., "High-Efficiency and Wideband Interlayer Grating Couplers in Multilayer Si/SiO2/SiN Platform for 3D Integration of Optical Functionalities," OSA 2014, pp. 1-11.

Cai et al., "Analysis of the Coupling Characteristics of a Tapered Three-Guide Coupled System," Journal of Lightwave Technology, vol. 8, No. 10, 1990, pp. 1621-1629.

Maegami et al., "Completely CMOS compatible SiN-Waveguide-Based Fiber Coupling Structure for Si Wire Waveguides," Optics Express 16856, vol. 24, No. 15, 2016, pp. 1-10.

Mu et al., "Edge Couplers in Silicon Photonic Integrated Circuits: A Review," Applied Sciences, 2020, 10, 1538, pp. 1-29.

Zhu et al., "Very High Efficiency Optical Coupler for Silicon Nanophotonic Waveguide and Single Mode Optical Fiber," Optics Express 18462, vol. 25, No. 15, 2017, pp. 1-12.

IMEC, "IMEC'S Si Photonics Platform: Prototyping Services On 200MM And 300 MM Wafers", https://www.imec-int.com/drupal/sites/defaul/files/2019-03/SILICON-PHOTONICS-V06, Accessed on Mar. 31, 2022, pp. 1-4.

Peng et al., "A CMOS Compatible Monolithic Fiber Attach Solution with Reliable Performance and Self-Alignment," Optical Fiber Communication Conference (OFC) 2020, OSA Technical Digest (Optical Society of America, 2020).

Bian et al., "Hybrid III-V laser integration on a Monolithic Silicon Photonic Platform," Optical Fiber Communication Conference (OFC) 2021 OSA Technical Digest (Optical Publishing Group, 2021), paper M5A.2.

Grineviciute et al., "Impact of Deposition Conditions on Nanostructured Anisotropic Silica Thin Films in Multilayer Interference Coatings," Applied Surface Science, 562, 2021, pp. 1-8.

Schubert, Martin F. et al., "Distributed Bragg Reflector Consisting of High- and Low-Refractive-Index Thin Film Layers Made of the Same Material," Applied Physics Letters, 90, 141115, 2007, pp. 1-3.

Pawlak, Dorota A., "Metamaterials and Photonic Crystals—Potential Applications for Self-Organized Eutectic Micro- and Nanostructures," Scientia Plena, vol. 4, No. 1, 2008, pp. 1-11.

U.S. Appl. No. 17/709,841, response to Final Office Action filed Aug. 21, 2023, 10 pages.

* cited by examiner

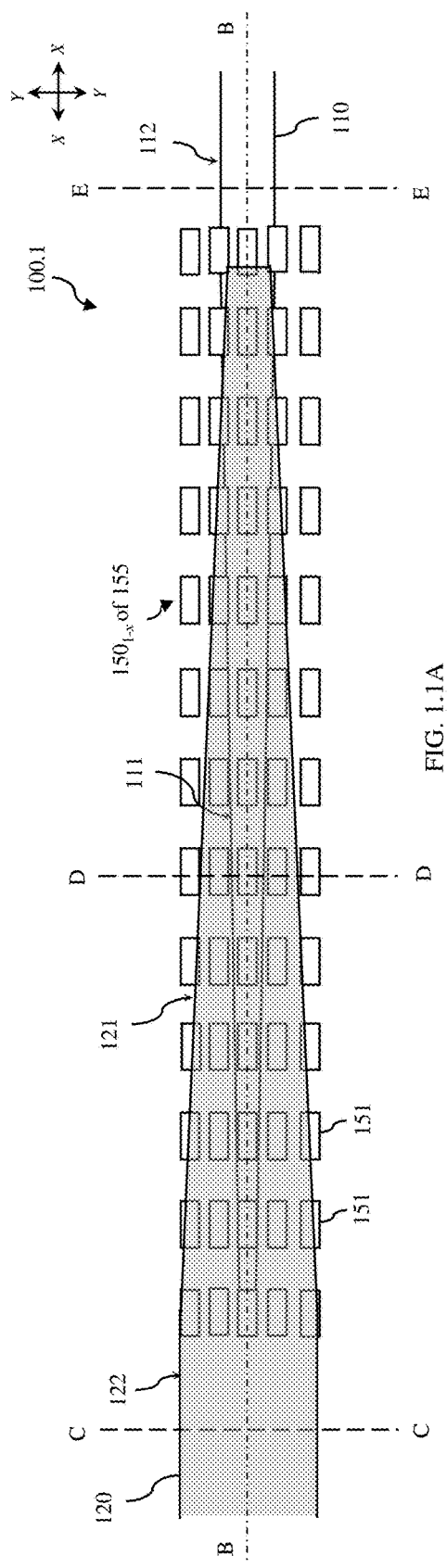
FIG. 1.1A
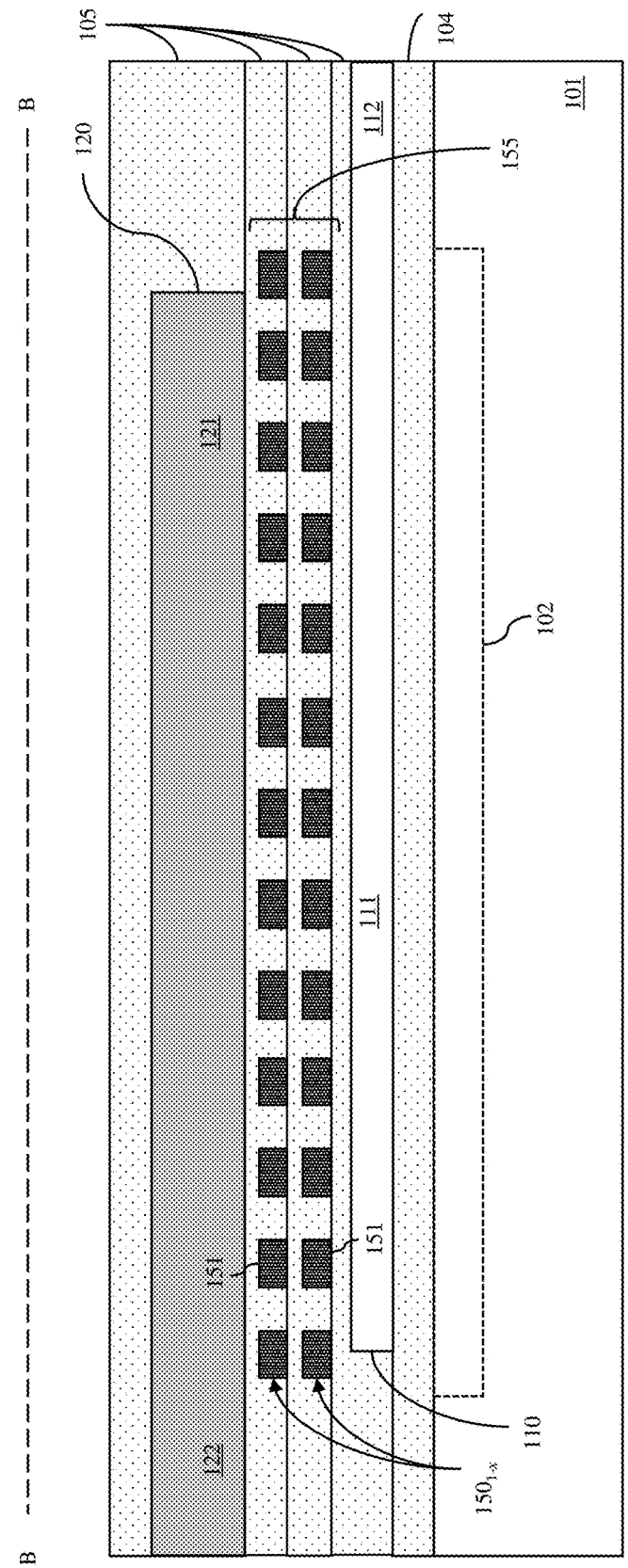
FIG. 1.1B

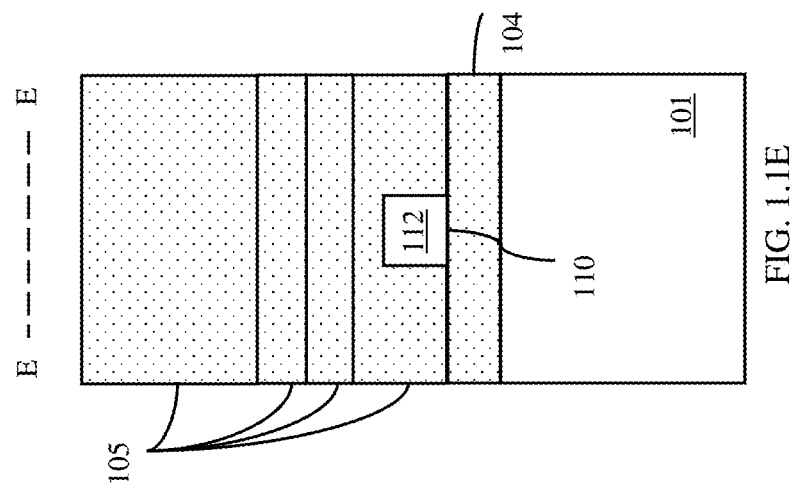
FIG. 1.1E
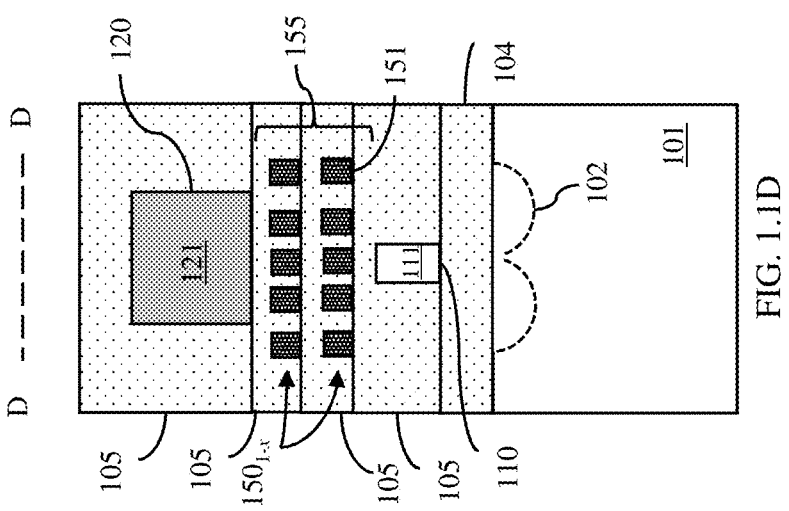
FIG. 1.1D
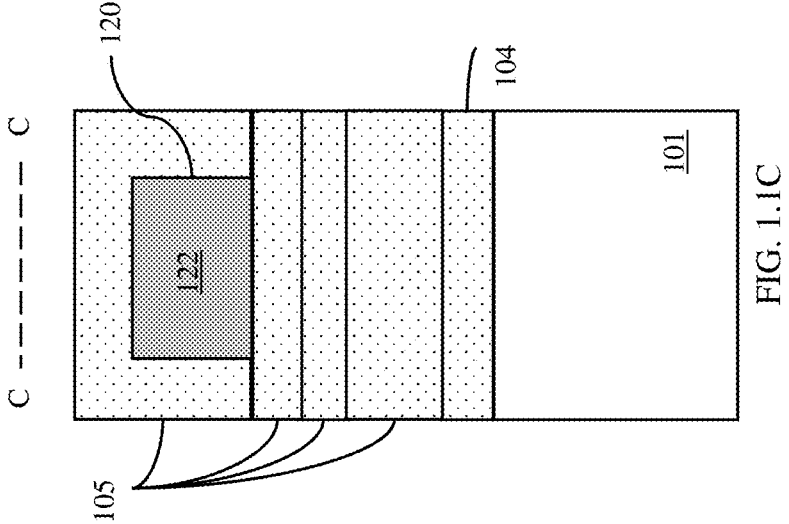
FIG. 1.1C

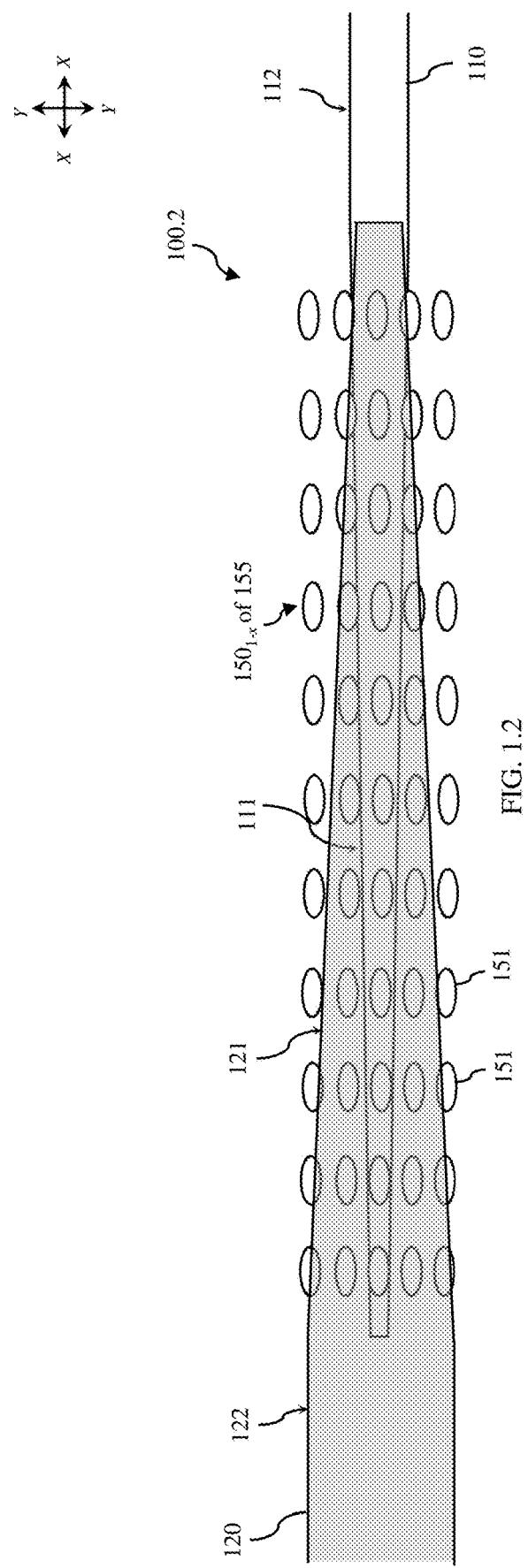
FIG. 1.2

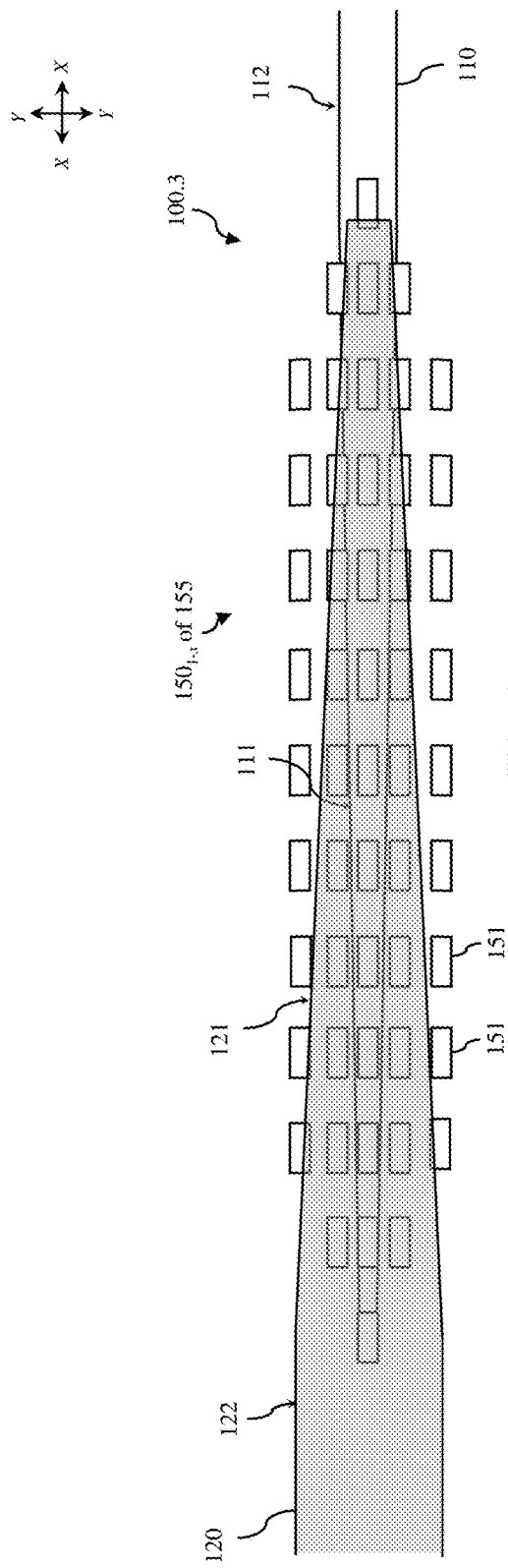
FIG. 1.3
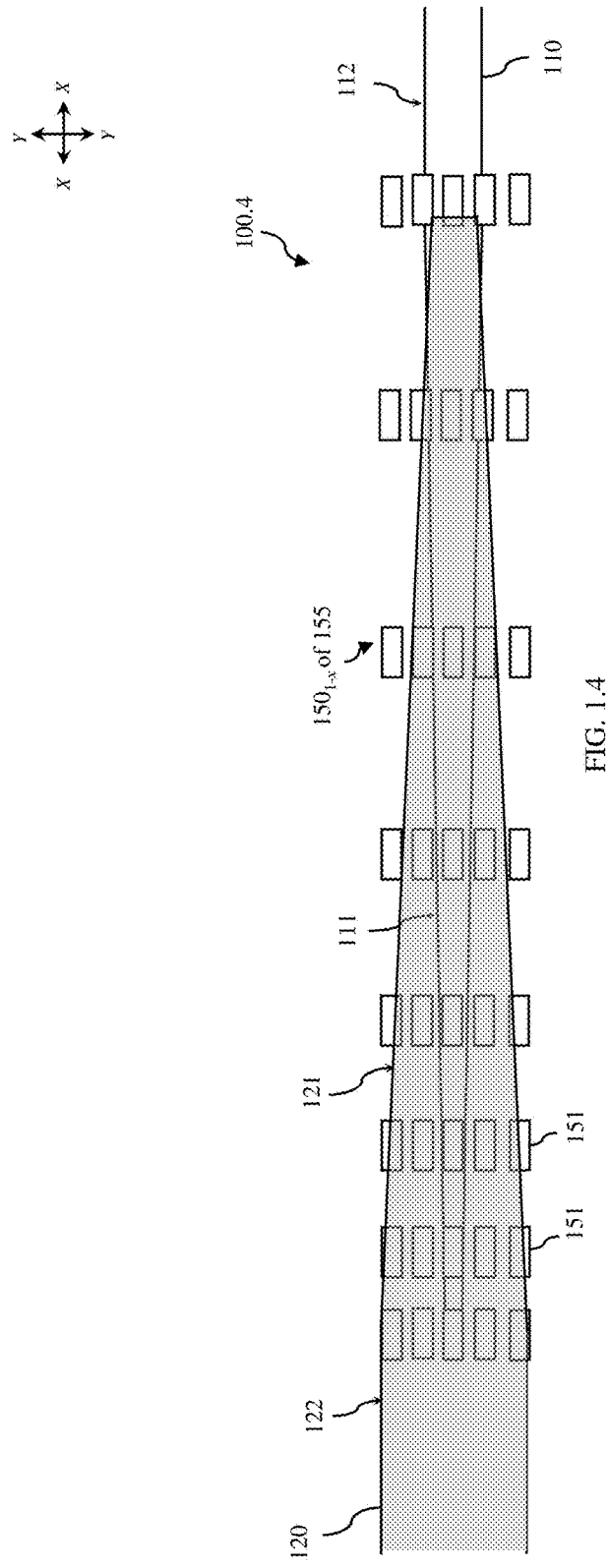
FIG. 1.4

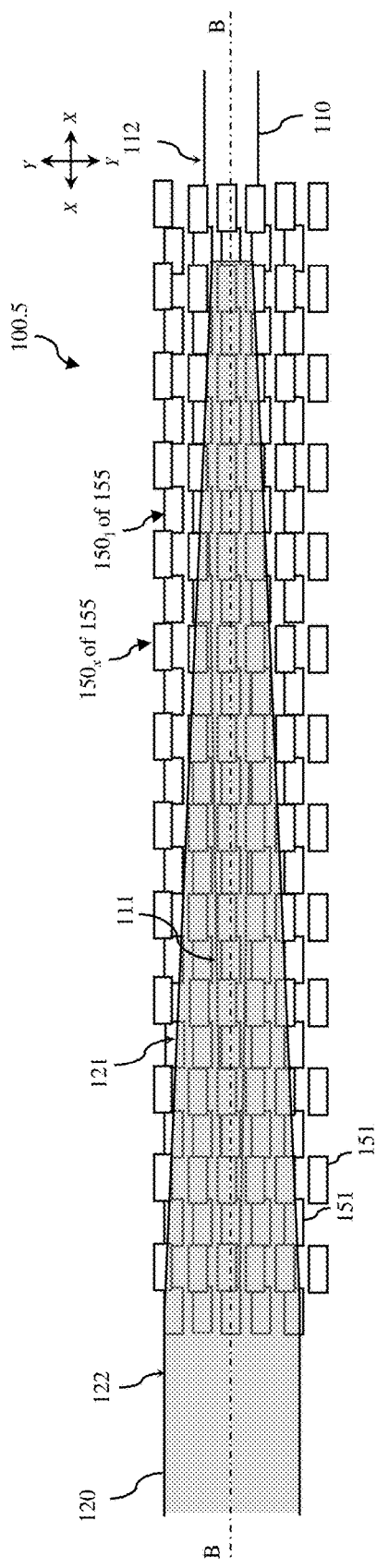
FIG. 1.5A
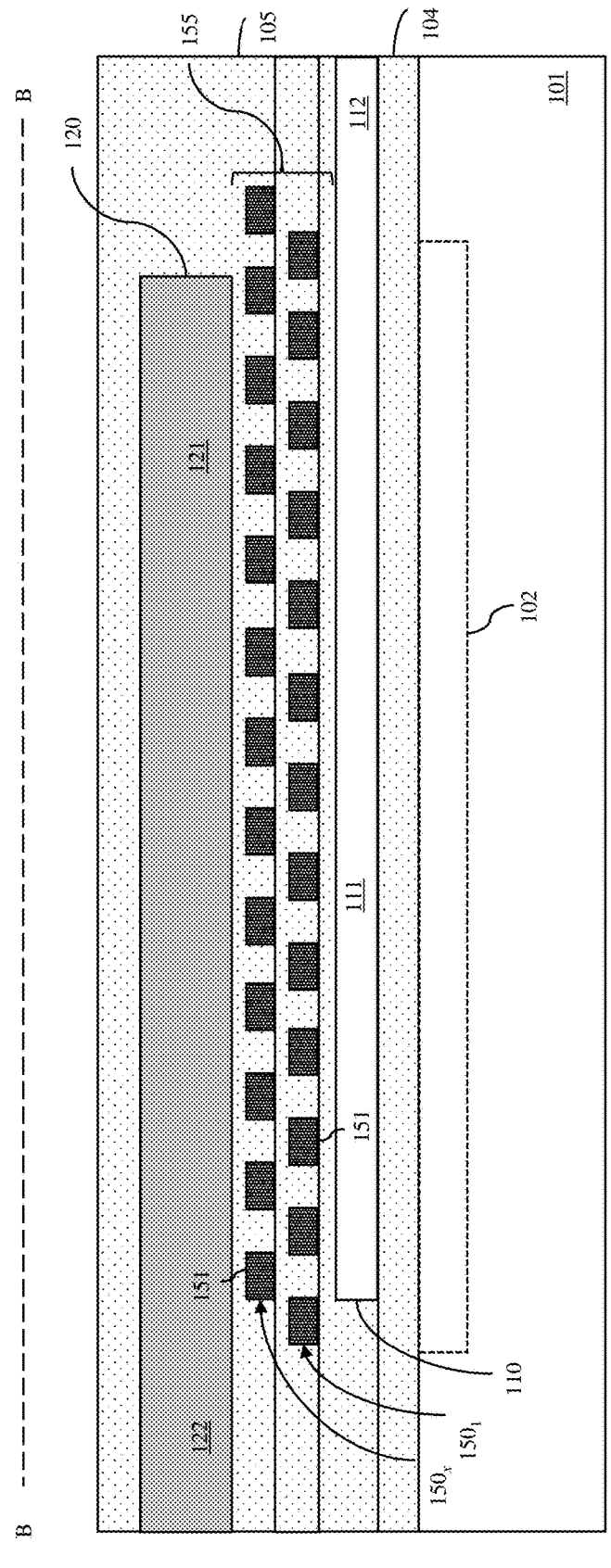
FIG. 1.5B

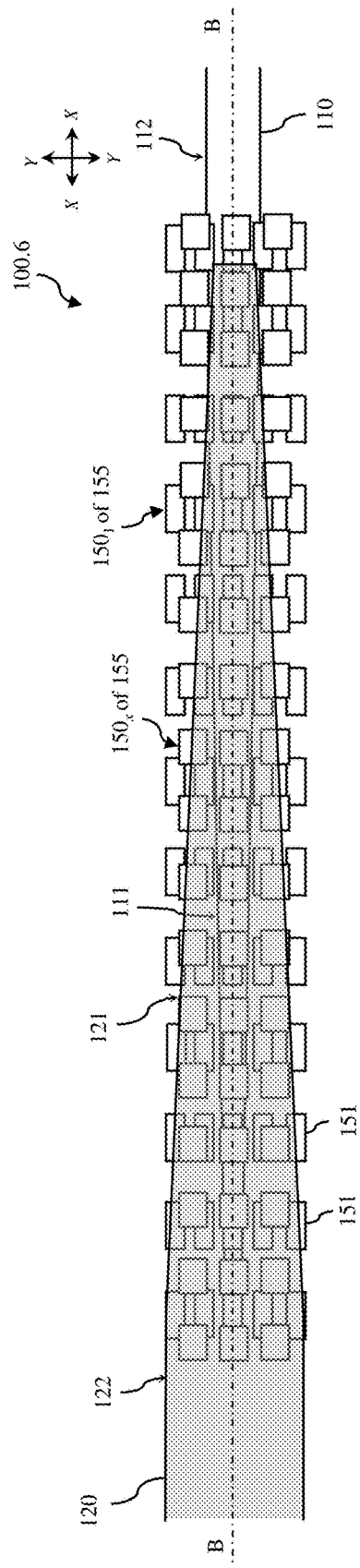
FIG. 1.6A
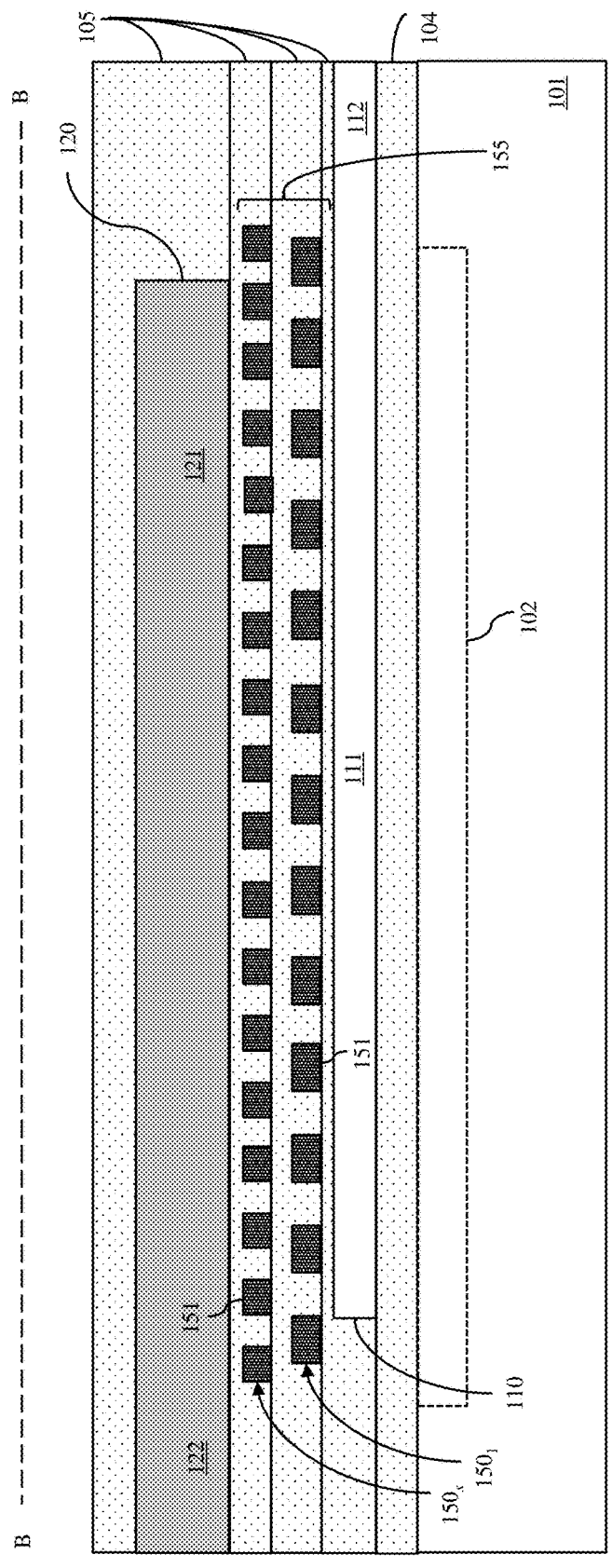
FIG. 1.6B

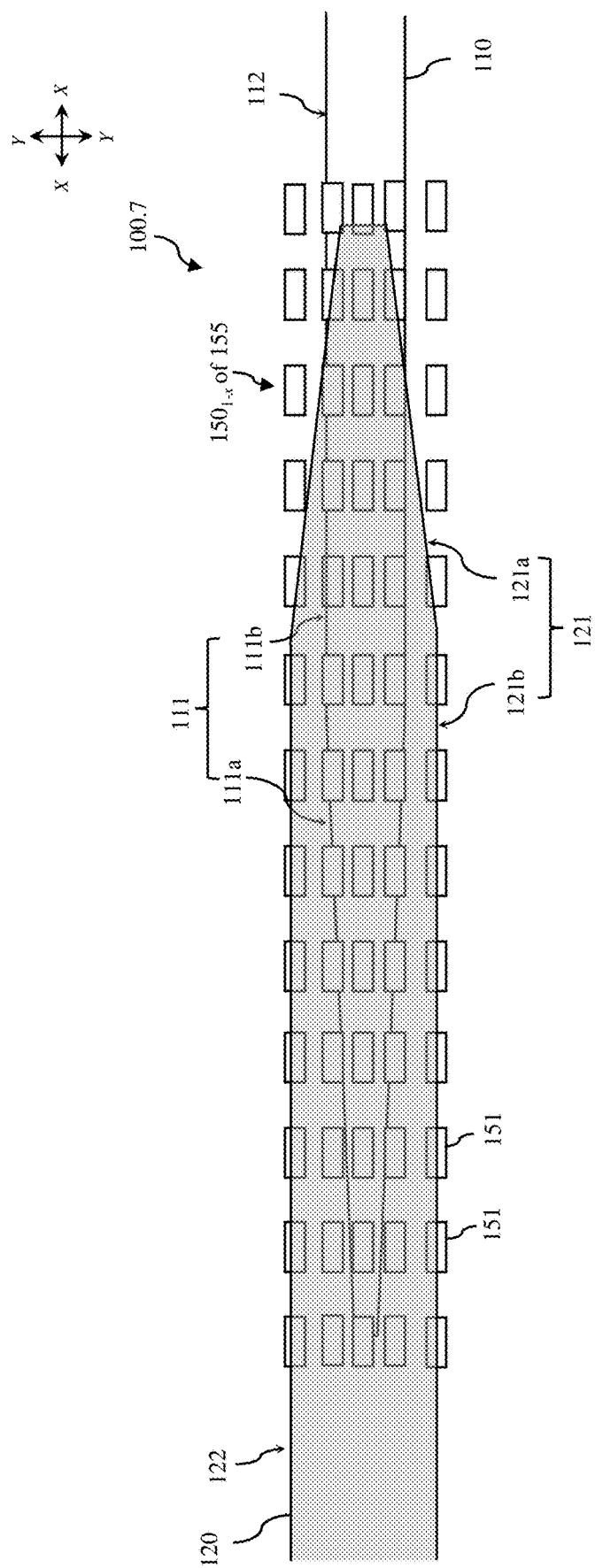
FIG. 1.7

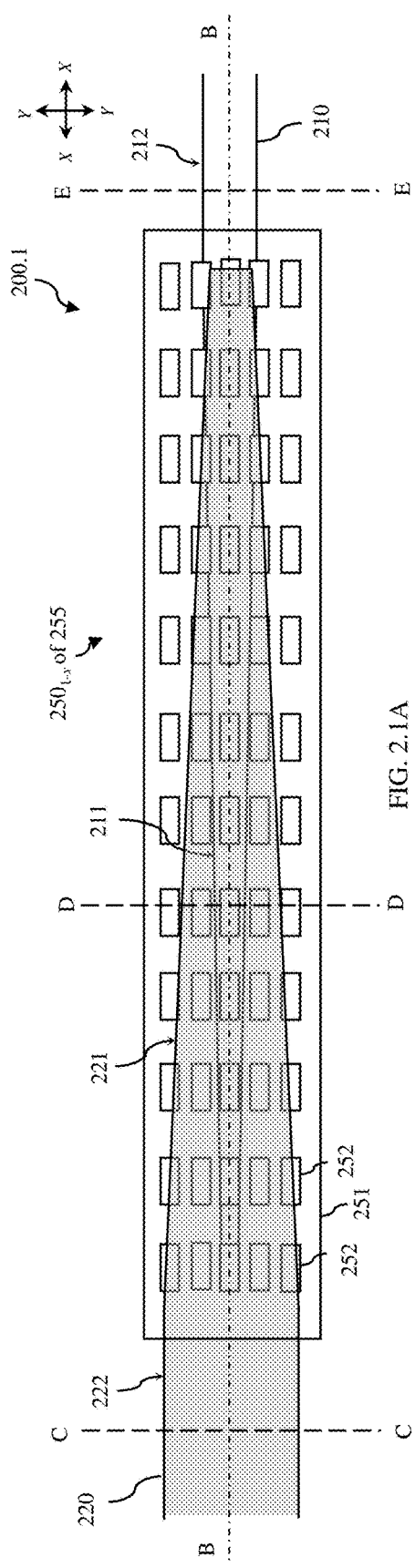
FIG. 2.1A
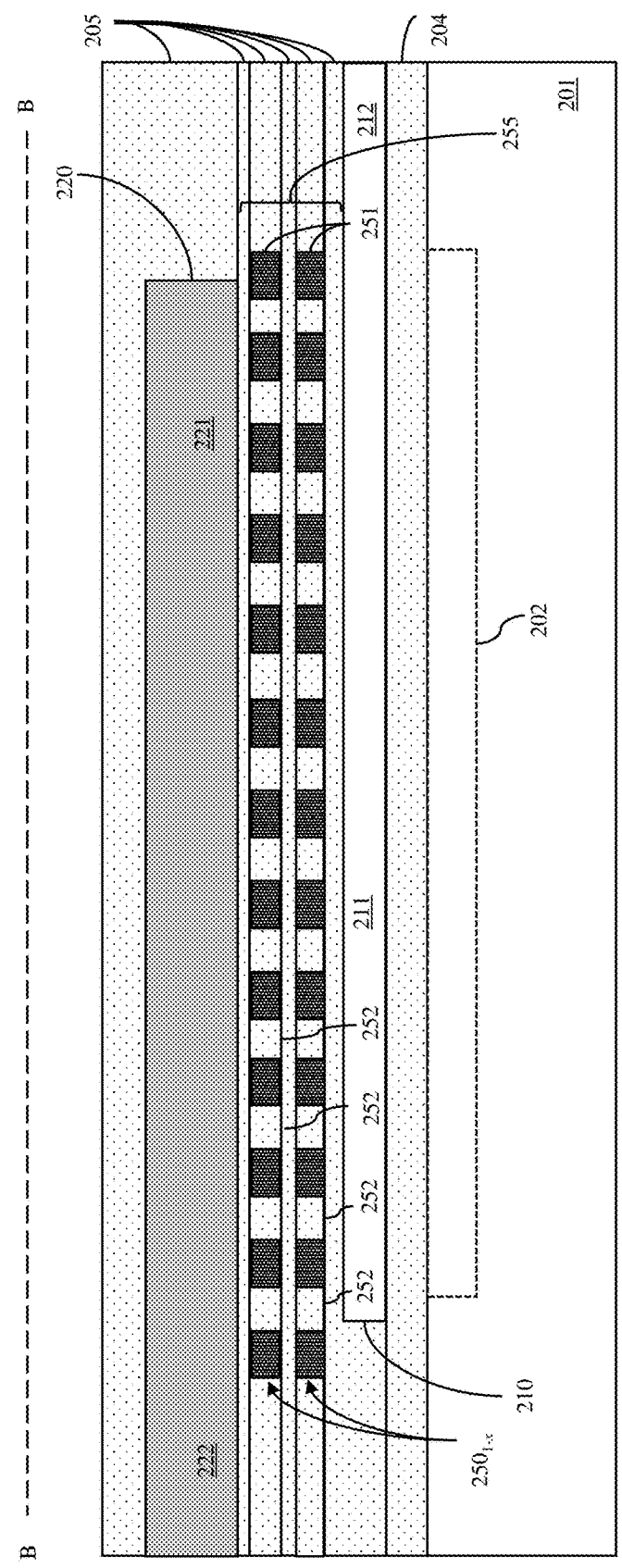
FIG. 2.1B

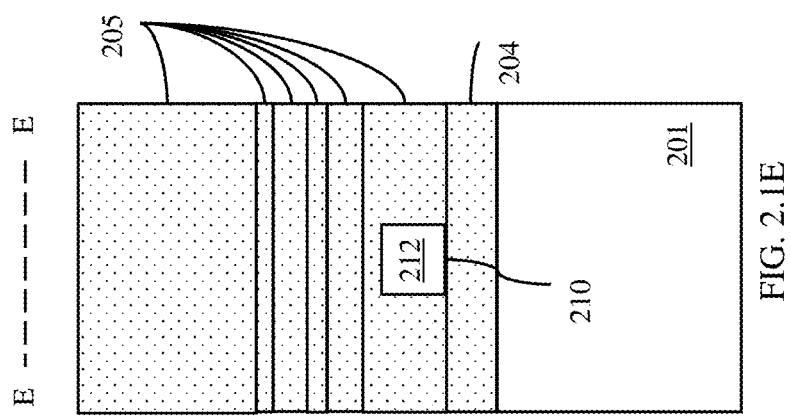
FIG. 2.1E
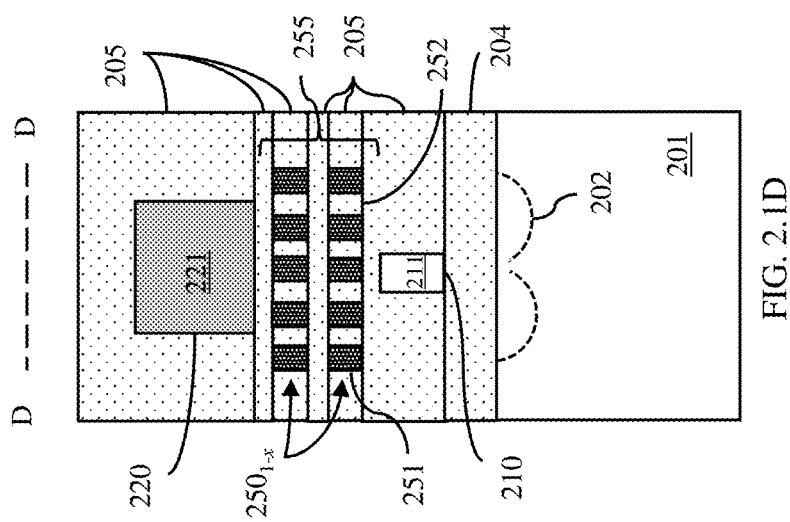
FIG. 2.1D
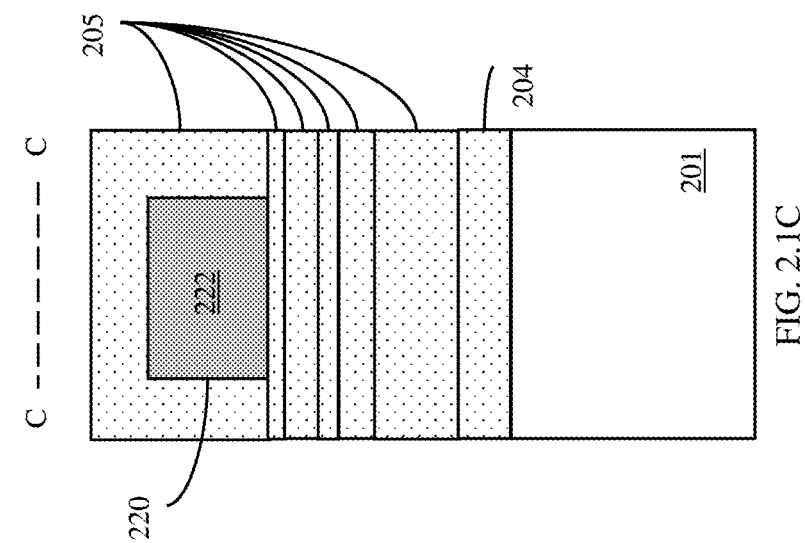
FIG. 2.1C

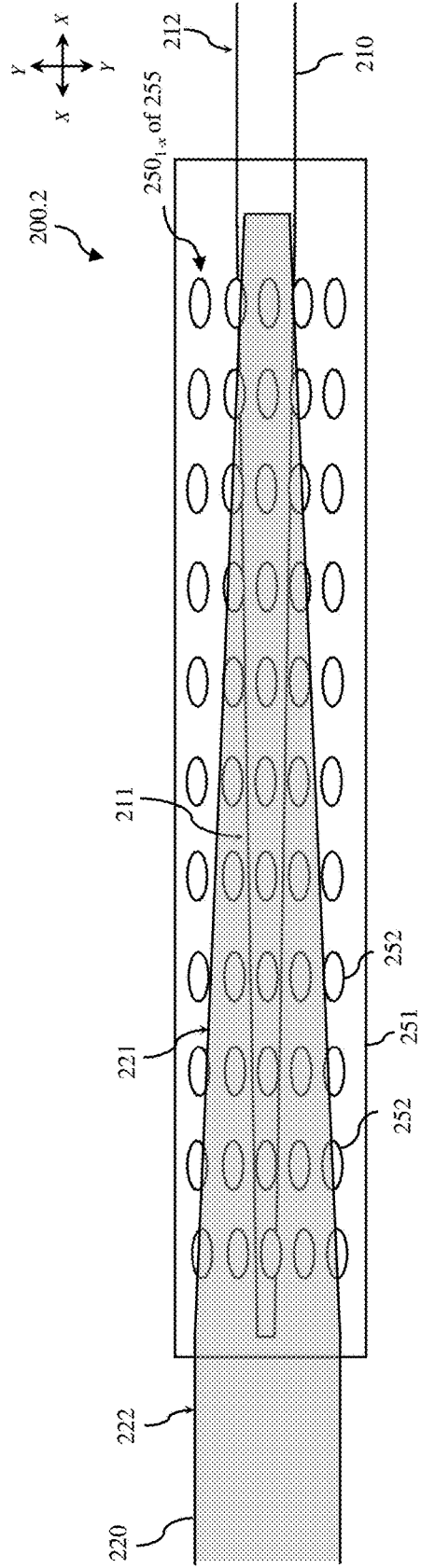
FIG. 2.2
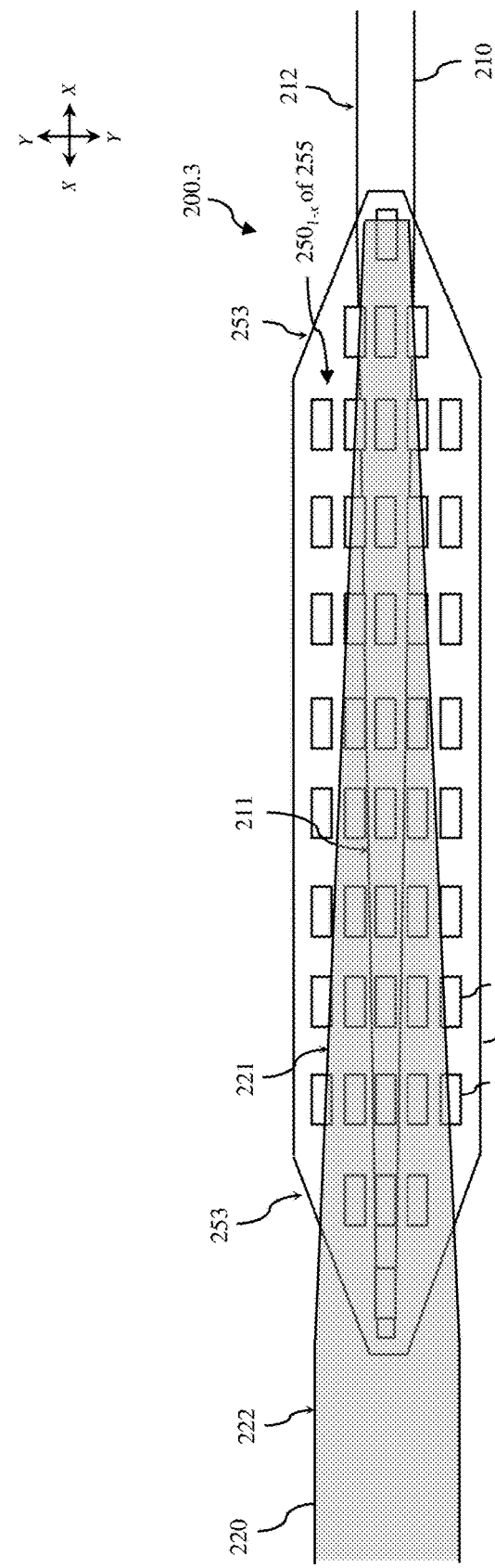
FIG. 2.3

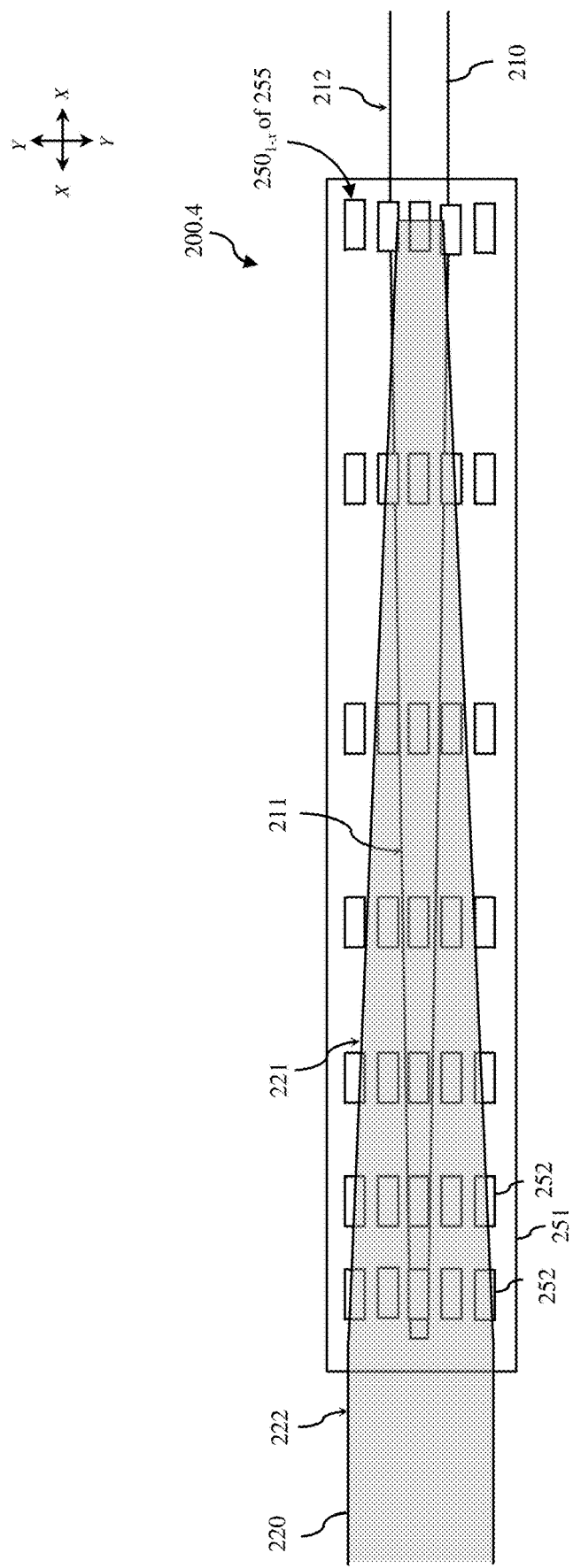
FIG. 2.4

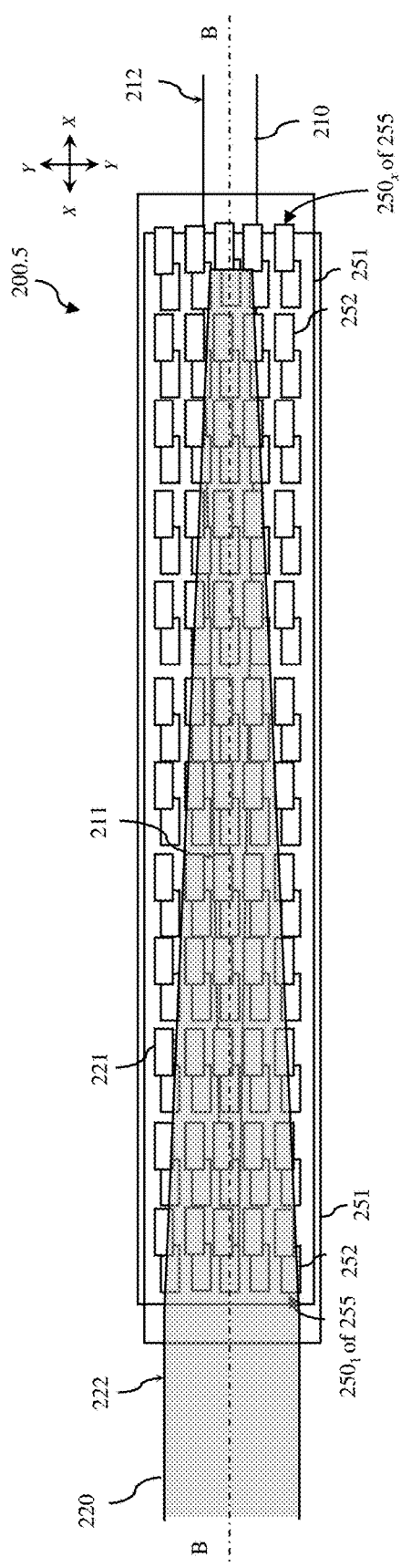
FIG. 2.5A
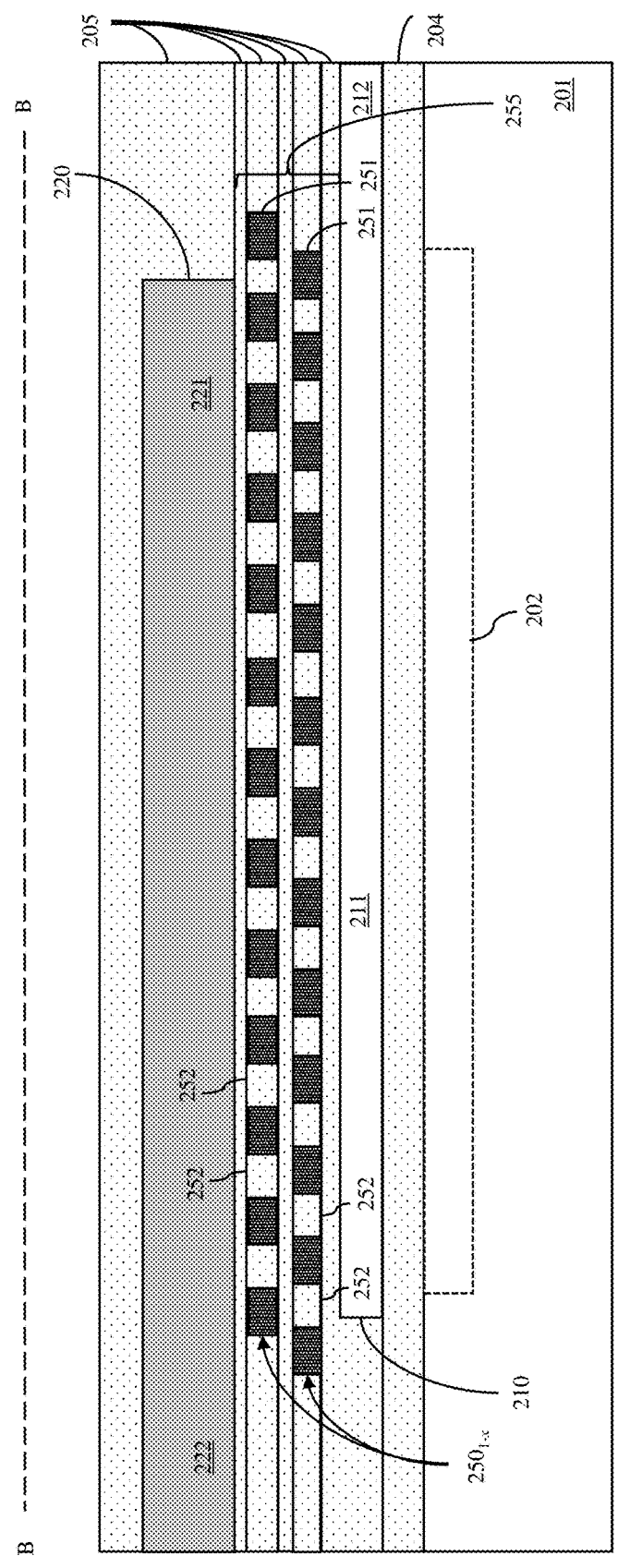
FIG. 2.5B

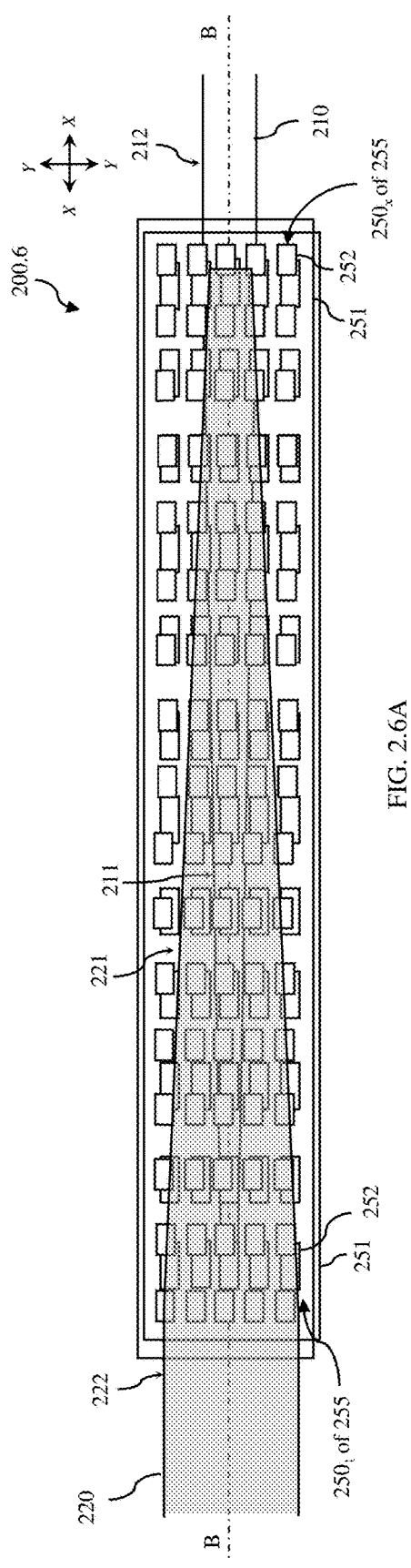
FIG. 2.6A
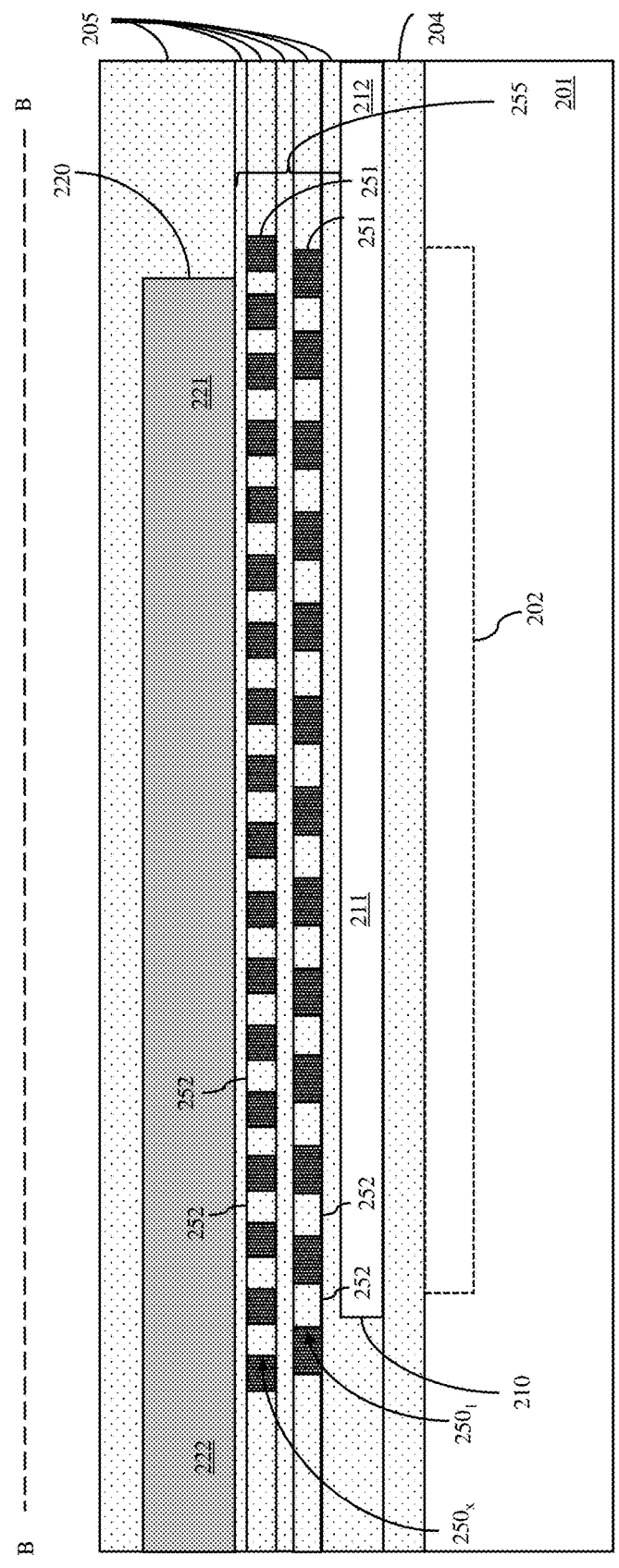
FIG. 2.6B

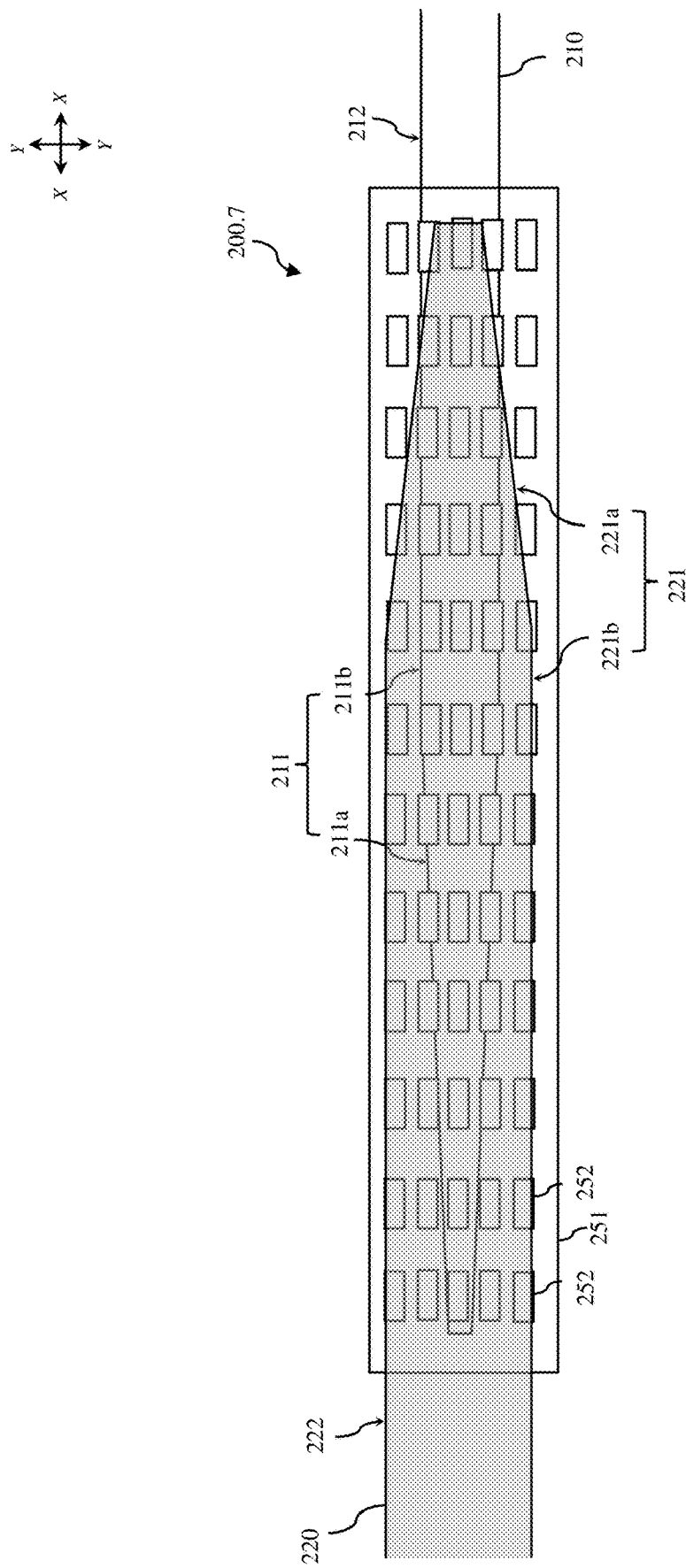
FIG. 2.7

PHOTONIC INTEGRATED CIRCUIT STRUCTURE WITH COUPLER FOR INTERLAYER WAVEGUIDE COUPLING

BACKGROUND

Field of the Invention

The present invention relates to photonic integrated circuit (PIC) structures and, more particularly, to embodiments of a PIC structure including a coupler for improved interlayer waveguide coupling.

Description of Related Art

In photonic integrated circuit (PIC) structures, two waveguides can be coupled so that optical signals can pass between them. For example, two waveguide cores can be in different layers of a PIC structure and each surrounded by cladding. An end portion of one of the waveguide cores can extend laterally over an end portion of the other waveguide core. These adjacent end portions of the two waveguide cores can be physically separated by the cladding. However, they must be sufficiently close so that optical signals can pass between them and, particularly, so that optical signals can pass around a location, along the adjacent end portions, where mode matching occurs (i.e., where the propagation constant of optical mode inside the two waveguides becomes the same). Unfortunately, in some applications, other design considerations can make it difficult to limit the separation distance between the adjacent end portions of the two waveguides without exceeding some predetermined optimal maximum threshold amount of signal loss.

SUMMARY

Embodiments of a structure disclosed herein can include a first waveguide core with a first end portion and a second waveguide core with a second end portion that overlays and is physically separated from the first end portion. The structure can further include a coupler to facilitate transmission of optical signals between the first end portion and the second end portion. This coupler can include an array of photonic material elements (e.g., photonic crystal elements or photonic metamaterial elements) between and physically separated from the first end portion and the second end portion. The first waveguide core, the second waveguide core and the photonic material elements can each be surrounded by cladding material.

Additional embodiments of a structure disclosed herein can similarly include a first waveguide core with a first end portion, a second waveguide core with a second end portion that overlays and is physically separated from the first end portion, and a coupler to facilitate transmission of optical signals between the first end portion and the second end portion. In these embodiments, the coupler can include a photonic material layer (e.g., a photonic crystal layer or a photonic metamaterial layer) between and physically separated from the first end portion and the second end portion and an array of cladding material elements extending through the photonic material layer. The first waveguide core, the second waveguide core and the photonic material layer can each be surrounded by cladding material.

Still other embodiments of a structure disclosed herein can include a crossing array implemented using any of the disclosed couplers. For example, such a structure can include a group of first waveguide cores. In this group, the first waveguide cores can have first end portions, respectively. The structure can further include a group of second waveguide cores. In this group, the second waveguide cores can be parallel and can have second end portions overlaying and physically separated from the first end portions, respectively. The structure can further include a group of third waveguide cores. The group of second waveguide cores can overlay the group of third waveguide cores with the third waveguide cores being oriented essentially perpendicular to the second waveguide cores (e.g., in a crossing array arrangement). The structure can further include a group of couplers. Each coupler can include, for example, an array of photonic material elements (e.g., photonic crystal elements or photonic metamaterial elements) between and physically separated from the first end portion and the second end portion. Alternatively, each coupler can include a photonic material layer (e.g., a photonic crystal layer or a photonic metamaterial layer) between and physically separated from the first end portion and the second end portion and an array of cladding material elements extending through the photonic material layer. The first waveguide core, the second waveguide core and the photonic material elements or the photonic material layer, as applicable, can each be surrounded by cladding material.

BRIEF DESCRIPTION OF THE SEVERAL VIEWS OF THE DRAWINGS

The present invention will be better understood from the following detailed description with reference to the drawings, which are not necessarily drawn to scale and in which:

FIG. 1.1A is a layout diagram and FIGS. 1.1B-1.1E are different cross-section diagrams illustrating an embodiment of PIC structure;

FIGS. 1.2-1.4 are different layout diagrams illustrating different PIC structures, respectively, which are variations on the PIC structure of FIGS. 1.1A-1.1E;

FIG. 1.5A is a layout diagram and FIG. 1.5B is a cross-section diagram illustrating another PIC structure, which is another variation on the PIC structure of FIGS. 1.1A-1.1E;

FIG. 1.6A is a layout diagram and FIG. 1.6B is a cross-section diagram illustrating yet another PIC structure, which is yet another variation on the PIC structure of FIGS. 1.1A-1.1E;

FIG. 1.7 is a layout diagram illustrating yet another PIC structure, which is yet another variation on the PIC structure of FIGS. 1.1A-1.1E;

FIG. 2.1A is a layout diagram and FIGS. 2.1B-2.1E are different cross-section diagrams illustrating another embodiment of a PIC structure;

FIGS. 2.2-2.4 are different layout diagrams illustrating different PIC structures, respectively, which are variations on the PIC structure of FIGS. 2.1A-2.1E;

FIG. 2.5A is a layout diagram and FIG. 2.5B is a cross-section diagram illustrating another PIC structure, which is another variation on the PIC structure of FIGS. 2.1A-2.1E;

FIG. 2.6A is a layout diagram and FIG. 2.6B is a cross-section diagram illustrating yet another PIC structure, which is yet another variation on the PIC structure of FIGS. 2.1A-2.1E;

FIG. 2.7 is a layout diagram illustrating yet another PIC structure, which is yet another variation on the PIC structure of FIGS. 2.1A-2.1E;

DETAILED DESCRIPTION

Figure 3:
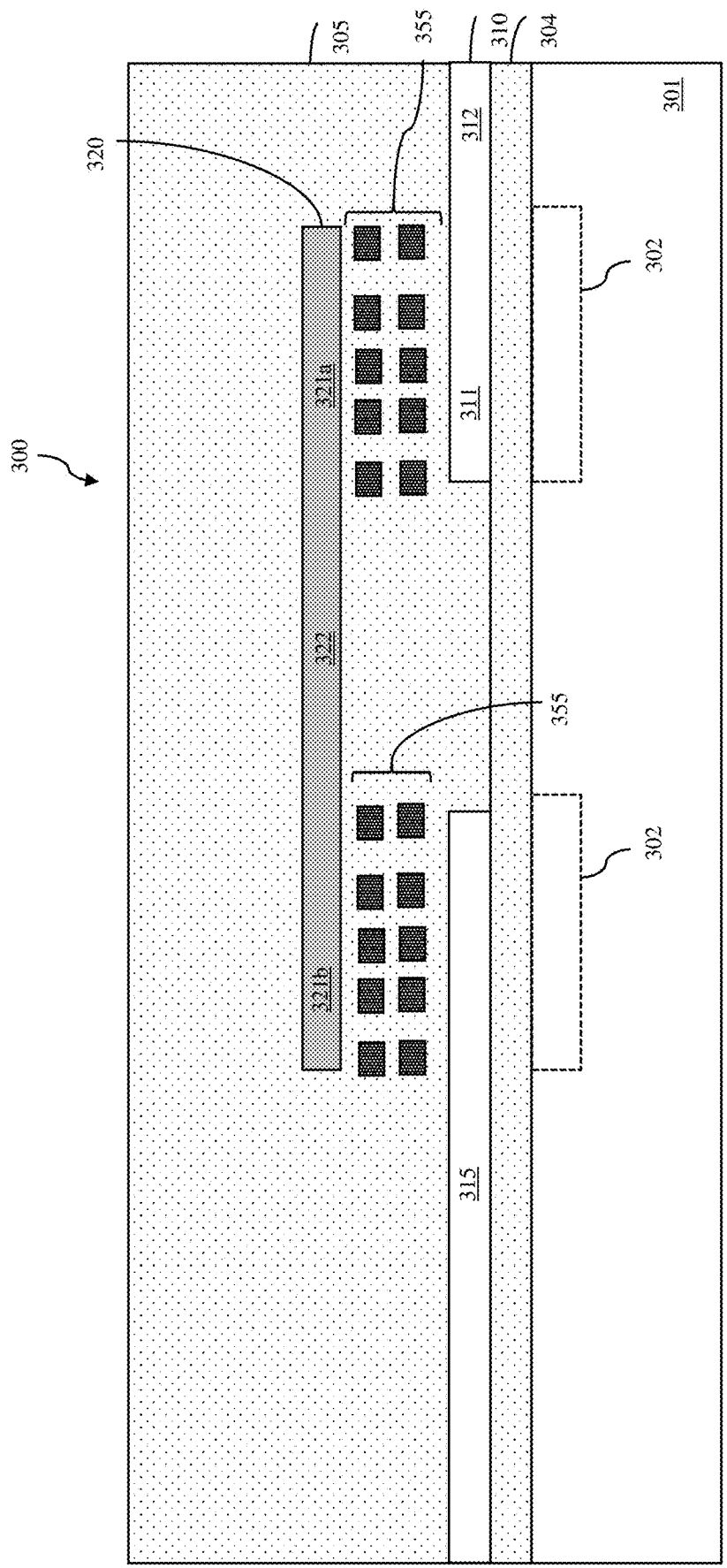
FIGS. 3 and 4 are cross-section diagrams illustrating additional PIC structures, respectively, incorporating multiple couplers.

As mentioned above, in PIC structures, two waveguides can be coupled so that optical signals can pass between them. For example, two waveguide cores can be in different layers of a PIC structure and surrounded by cladding. An end portion of one of the waveguide cores can extend laterally over an end portion of the other waveguide core. These adjacent end portions of the two waveguide cores can be physically separated by the cladding. However, they must be sufficiently close so that optical signals can pass between them and, particularly, so that optical signals can pass around a location, along the adjacent end portions, where mode matching occurs (i.e., where the propagation constant of optical mode inside the two waveguides becomes the same). Unfortunately, in some applications, other design considerations can make it difficult to limit the separation distance between the adjacent end portions of the two waveguides without exceeding some optimal maximum threshold amount for signal loss.

In view of the foregoing, disclosed herein are embodiments of a PIC structure including waveguide cores and a coupler configured to facilitate low-loss optical signal transmission between the waveguide cores and, particularly, to facilitate interlayer waveguide coupling when the separation distance between adjacent overlapping end portions of the waveguide cores is too great to allow optical signals to pass therebetween without exceeding some optimal maximum threshold amount of signal loss. In some embodiments, the coupler can include at least one array of photonic material elements (e.g., photonic crystal elements or photonic metamaterial elements) embedded in cladding material between the end portions. In other embodiments, the coupler can include at least one photonic material layer (e.g., a photonic crystal layer or a photonic metamaterial layer) between and physically separated from the end portions and an array of cladding material elements extending through the photonic material layer. As discussed further in the detailed description section, performance can be optimized in the disclosed structure embodiments by varying any of the following: the shapes of the adjacent end portions of the waveguide cores; the number of layers in a coupler; the shapes, sizes, materials and/or numbers of elements in an array of elements in a coupler; the pattern of elements in an array of elements in a coupler; etc. Optionally, an in-substrate cavity can be aligned below a coupler to minimize leakage loss. Also disclosed herein are embodiments of a PIC structure including an on-chip system (e.g., a photonic computing system) including a crossing array implemented using any of the above-described couplers.

More particularly, FIG. 1.1A is a layout diagram and FIGS. 1.1B-1.1E are different cross-section diagrams illustrating an embodiment of a PIC structure 100.1. FIGS. 1.2-1.4 are different layout diagrams illustrating PIC structures 100.2-100.4, respectively, which are variations on the PIC structure 100.1 of FIGS. 1.1A-1.1E. FIG. 1.5A is a layout diagram and FIG. 1.5B is a cross-section diagram illustrating a PIC structure 100.5, which is another variation on the PIC structure 100.1 of FIGS. 1.1A-1.1E. FIG. 1.6A is a layout diagram and FIG. 1.6B is a cross-section diagram illustrating a PIC structure 100.6, which is yet another variation on the PIC structure 100.1 of FIGS. 1.1A-1.1E. FIG. 1.7 is a layout diagram illustrating a PIC structure 100.7, which is yet another variation on the PIC structure 100.1 of FIGS. 1.1A-1.1E. FIG. 2.1A is a layout diagram and FIGS. 2.1B-2.1E are different cross-section diagrams illustrating another embodiment of a PIC structure 200.1. FIGS. 2.2-2.4 are different layout diagrams illustrating PIC structures 200.2-200.4, respectively, which are variations on the PIC structure 200.1 of FIGS. 2.1A-2.1E. FIG. 2.5A is a layout diagram and FIG. 2.5B is a cross-section diagram illustrating a PIC structure 200.5, which is another variation on the PIC structure 200.1 of FIGS. 2.1A-2.1E. FIG. 2.6A is a layout diagram and FIG. 2.6B is a cross-section diagram illustrating a PIC structure 200.6, which is yet another variation on the PIC structure 200.1 of FIGS. 2.1A-2.1E. FIG. 2.7 is a layout diagram illustrating a PIC structure 200.7, which is yet another variation on the PIC structure 200.1 of FIGS. 2.1A-2.1E.

In each of these embodiments, the PIC structures 100.1-100.7, 200.1-200.7 can include waveguides in different layers (i.e., at different levels of the structure) and can further include a coupler 155, 255 to facilitate low-loss optical signal transmission between the waveguides in the different layers (i.e., to facilitate interlayer waveguide coupling).

Specifically, referring to FIGS. 1.1A-1.1E, 1.2, 1.3, 1.4, 1.5A-1.5B, 1.6A-1.6B, and 1.7 and to FIGS. 2.1A-2.1E, 2.2, 2.3, 2.4, 2.5A-2.5B, 2.6A-2.6B and 2.7, the PIC structures 100.1-100.7, 200.1-200.7 can include a substrate 101, 201. The substrate 101, 201 can be, for example, a semiconductor substrate, such as a silicon substrate. The substrate can have a first surface (e.g., a bottom surface) and a second surface (e.g., a top surface) opposite the first surface. Optionally, the PIC structures 100.1-100.7, 200.1-200.7 can further include an insulator layer 104, 204 on the second surface of the substrate 101, 201. The insulator layer 104, 204 can be, for example, a silicon dioxide layer (also referred to herein as a buried oxide (BOX) layer) or a layer of some other suitable insulator material.

The PIC structures 100.1-100.7, 200.1-200.7 can further include a first waveguide and a second waveguide above the second surface of the substrate (e.g., above the insulator layer 104, 204). The first waveguide can include a first waveguide core 110, 210 and cladding material 105, 205 surrounding the first waveguide core 110, 210. It should be noted that, if the first waveguide core 110, 210 is above and immediately adjacent to the insulator layer 104, 204, as illustrated, then that insulator layer is considered cladding material for the first waveguide core 110, 210 (see cladding material requirements discussed in greater detail below). The second waveguide can include a second waveguide core 120, 220 also surrounded by cladding material 105, 205. The first waveguide core 110, 210 and the second waveguide core 120, 220 can be in different layers (i.e., at different levels) of the PIC structures 100.1-100.7, 200.1-200.7. That is, the first waveguide core 110, 210 can be at a first height above the second surface of the substrate and the second waveguide core 120, 220 can be at a second height, which is greater than the first height, above the second surface of the substrate. Furthermore, the second waveguide core 120, 220 can partially overlay the first waveguide core 110, 210. That is, the first waveguide core 110, 210 can have a first main body 112, 212 and a first end portion 111, 211. The second waveguide core 120, 220 can have second main body 122, 222 and a second end portion 121, 221 that overlays, but is physically separated from, the first end portion 111, 211. That is, the first end portion and the second end portion can be in the same vertical plane with the second end portion being aligned above and separated from the first end portion.

The first main body extends away from the first end portion in a first direction and the second main body extends away from the second end portion in a second direction opposite the first direction such that the second main body does not overlay the first main body.

It should be noted that the first end portion 111, 211 of the first waveguide core 110, 210 and/or the second end portion 121, 221 of the second waveguide core 120, 220, 320 can be primarily tapered. Specifically, the width of the first end portion 111, 211 can taper down (i.e., decrease) from a first maximum width adjacent to the first main body 112, 212 to a first minimum width at an end wall farthest from the first main body (i.e., close to the second main body of the second waveguide core). For example, the width of the first end portion can taper down (i.e., decrease) essentially linearly (e.g., see the tapered first end portion 111 in the PIC structures 100.1-100.6 of FIGS. 1.1A-1.6B; see also the tapered first end portion 211 in the PIC structures 100.1-100.7 of FIGS. 2.1A-2.6B). Additionally or alternatively, the width of the second end portion 121, 221 can taper down (i.e., decrease) from a second maximum width adjacent to the second main body 122, 222 to a second minimum width at an end wall farthest from the second main body (i.e., close to the first main body of the first waveguide core) For example, the width of the second end portion can taper down (i.e., decrease) essentially linearly (e.g., see the tapered second end portion 121 in the PIC structures 100.1-100.6 of FIGS. 1.1A-1.6B; see also the tapered second end portion 221 in the PIC structures 100.1-100.7 of FIGS. 2.1A-2.6B). Alternatively, the width of the first end portion and/or the width of the second end portion could taper exponentially (not shown). Alternatively, the first end portion and the second end portion could each have two or more sections with different shapes. For example, alternatively, as illustrated in the PIC structures 100.7 of FIGS. 1.7 and 200.7 of FIG. 2.7, the first end portion 111, 211 can have a tapered first section 111a, 211a and an additional first section 111b, 211b, which is positioned laterally between the tapered first section 111a, 211a and the first main body 112, 212 of the first waveguide core 110, 210 and which has a different shape than the tapered first section 111a, 211a. The additional first section 111b, 211b can, for example, have an essentially uniform width, as illustrated, or a tapered width but at a different taper angle than the tapered first section 111a, 211a. Similarly, the second end portion 121, 221 can have a tapered second section 121a, 221a and an additional second section 121b, 221b, which is positioned laterally between the tapered second section 121a, 221a and the second main body 122, 222 of the second waveguide core 120, 220 and which has a different shape than the tapered second section 121a, 221a. The additional second section 121b, 221b can, for example, have an essentially uniform width, as illustrated, or a tapered width but at a different taper angle than the tapered second section 121a, 221a. In this case, the tapered second section 121a, 221b of the second end portion 121, 221 can overlay the additional first section 111b, 211b of the first end portion 111, 211 and the additional second section 121b, 221b can overlay the tapered first section 111a, 211a. Alternatively, the first end portion 111, 211 and the second end portion 121, 221 can have any other suitable shape designed to improve interlayer waveguide coupling.

As mentioned above, for optical signals to pass between two waveguides (i.e., from one waveguide core to another waveguide core) adjacent portions of the two waveguide cores must be sufficiently close and there must be mode matching at a location along the adjacent portions of the waveguide cores (i.e., there must at least one location where the propagation constant of optical mode inside the two adjacent portions is the same). Those skilled in the art will recognize that the optical mode of light is generally determined by refractive index profile of the waveguide core and its cross-sectional geometric size and shape. If the waveguide cores have the same refractive index profiles, mode matching generally occurs at a location where the cross-sectional areas of the adjacent portions of the waveguide cores are approximately the same. If the waveguide cores are made of different core materials with different refractive index profiles, mode matching can occur at a location where the adjacent portions of the waveguide cores have different cross-sectional areas but the same propagation constant which is determined by the respective combinations of refractive index and cross-sectional area. When the sizes and/or the materials of the waveguide cores are different, these differences must be accounted for in order to achieve mode matching. Tapering of the first end portion 111, 211 and/or tapering of the second end portion 121, 221, as discussed above, can be employed to increase the likelihood that mode matching will occur between adjacent waveguide cores of different materials and/or sizes and/or in the presences of process variations.

In any case, in order to enhance optical coupling between the two waveguides and, particularly, to ensure that some optimal maximum threshold amount for signal loss is not exceeded due to the separation distance between the first end portion 111, 211 of the first waveguide core 110, 210 and the second end portion 121, 221 of the second waveguide core 120, 220, the PIC structures 100.1-100.7, 200.1-200.7 can further include a coupler 155, 255 (also referred to as an enhanced coupling region) between the first end portion 111, 211 and the second end portion 121, 221. The coupler can include at least one array of photonic material elements embedded in cladding material (e.g., see the coupler 155 in the PIC structures 100.1 of FIGS. 1.1A-1.1E, 100.2 of FIG. 1.2, 100.3 of FIG. 1.3, 100.4 of FIG. 1.4, 100.5 of FIGS. 1.5A-1.5B, 100.6 of FIGS. 1.6A-1.6B, or 100.7 of FIG. 1.7) or, alternatively, can include at least one core material layer and an array of cladding material elements extending through the photonic material layer (e.g., see the coupler 255 in the PIC structures 200.1 of FIGS. 2.1A-2.1E, 200.2 of FIG. 2.2, 200.3 of FIG. 2.3, 200.4 of FIG. 2.4, 200.5 of FIGS. 2.5A-2.5B, 200.6 of FIGS. 2.6A-2.6B, or 200.7 of FIG. 2.7).

More particularly, referring to FIGS. 1.1A-1.7, the coupler 155 in the PIC structures 100.1-100.7 can include at least one array $150_{1-x}$ of discrete photonic material elements 151 embedded in cladding material 105 (i.e., each photonic material element 151 is surrounded on all sides, the bottom and the top by cladding material 105). The photonic material elements 151 can be, for example, photonic crystal elements (i.e., photonic crystals, also referred to as photonic bandgap material elements) or, alternatively, photonic metamaterial elements. For purposes of this disclosure, a photonic crystal refers to an optical structure in which the refractive index changes periodically in a particular manner that causes a particular impact on the propagation of light signals. The periodic changes in the refractive index in the optical structure can, for example, be due to the use of different material layers within the structure and/or due to the use of a series of different deposition specifications when depositing any one specific material layer during formation of the structure. For purposes of this disclosure, a photonic metamaterial refers to a composite optical structure in which different material layers are arranged in a particular pattern (e.g., in a repeating pattern or some other patterns) that causes a particular impact on the propagation of light signals. Such metamaterials derive their properties from internal microstructures and/or nanostructures (as opposed to chemical composition found in natural materials). Thus, the particular impact on the propagation of light signals may otherwise be unobserved in nature (e.g., unique to the optical structure).

The photonic material elements 151 in an array $150_{1-x}$ can be patterned optical structures with dimensions (e.g., length, width, height) in the 10's of microns to the 10's of nanometers (e.g., depending upon the technology node, the manufacturing process level containing the photonic material elements, the desired optical properties, etc.). The photonic material elements 151 in an array $150_{1-x}$ can, for example, all be the same size and the same three-dimensional shape. For example, the photonic material elements 151 in an array $150_{1-x}$ can all be three-dimensional rectangular shapes with essentially the same dimensions, as illustrated in the PIC structure 100.1 of FIGS. 1.1A-1.1E. Also, for example, the photonic material elements 151 in an array $150_{1-x}$ can all be elliptical pillar shapes with the same dimensions, e.g., as shown in the PIC structure 100.2 of FIG. 1.2. Alternatively, the photonic material elements 151 in an array $150_{1-x}$ could all have some other suitable shape (e.g., square pillar, circular pillar, hexagonal pillar, etc.). Alternatively, the photonic material elements 151 in an array $150_{1-x}$ could have some combination of different three-dimensional shapes and/or different sizes.

Additionally, the photonic material elements 151 in an array $150_{1-x}$ can be arranged in columns (e.g., in the Y-direction as illustrated in the layout diagrams), which are essentially perpendicular to and traverse the first end portion 111 and the second end portion 121, and in rows (e.g., in the X-direction as illustrated in the layout diagrams), which are parallel to the first end portion 111 and the second end portion 121. For example, the columns can all have the same number n of photonic material elements 151 with the same pitch between elements in the columns and the rows can all have the same number m of photonic material elements 151 with the same pitch between the elements in the rows (where n=m or where n+m and where the pitch between elements in the columns is either the same as or different from the pitch between elements in the rows), as shown in the PIC structure 100.1 of FIGS. 1.1A1.1E, such that the overall shape of the array is essentially rectangular. Alternatively, at least some of the columns could have different numbers of photonic material elements 151 with the same pitch between elements in the columns and/or at least some of the rows could have different numbers of photonic material elements 151 with the same pitch between elements in the rows, e.g., see the PIC structure 100.3 of FIG. 1.3 where the columns have the same pitch between elements, where the rows have the same pitch between elements, but where the outermost columns and uppermost and lowermost rows have fewer photonic material elements 151 than the inner columns and rows such that the overall shape of the array has tapered sides. Alternatively, the pitch between elements in some columns and/or the pitch between elements in some rows can varied, e.g., see the PIC structure 100.4 of FIG. 1.4 where the pitch between elements in the columns in the same but the pitch between elements in the rows decreases progressively from adjacent the first waveguide core 110 to adjacent the second waveguide core 120. Alternatively, the photonic material elements 151 in an array $150_{1-x}$ could be randomly patterned (not shown).

As mentioned above, the coupler 155 includes at least one array $150_{1-x}$ of discrete photonic material elements 151. Optionally, the coupler 155 can be multi-layered. That is, it can include two or more arrays $150_{1-x}$ of the discrete photonic material elements 151. These arrays can be stacked vertically between the first end portion 111 of the first waveguide core 110 and the second end portion 121 of the second waveguide core 120. They can be physically separated from the first end portion below, from the second end portion above, and from each other. They can also each be essentially embedded in cladding material 105 (i.e., surrounded by cladding material on the sides, below and above). For purposes of illustration, two arrays are shown in the figures. However, it should be understood that the figures are not intended to be limiting. Alternatively, the coupler 155 in the PIC structures 100.1-100.7 could include any number of one or more arrays.

In a multi-layered coupler 155, the arrays $150_{1-x}$ can be, for example, essentially identical. That is, in two identical arrays, the photonic material elements 151 in each array can have the same dimensions, can have the same shape, and can have the same material structure and the arrays can have the same numbers of columns and rows, can have the same numbers of photonic material elements in the columns and rows, can have the same pitch between elements in the columns, can have the same pitch between elements in the rows, and so on. Alternatively, in a multi-layered coupler 155, the arrays $150_{1-x}$ can be different in some way. That is, in two different arrays, the photonic material elements 151 in each array can have different dimensions and/or different shapes and/or different material structures and the arrays $150_{1-x}$ can have different numbers of columns and/or rows and/or different numbers of photonic material elements in the columns and/or in the rows and/or different pitches between elements in different columns and/or different pitches between elements in different rows and so on.

For example, in the PIC structures 100.1 of FIGS. 1.1A-1.1E, 100.2 of FIG. 1.2, 100.3 of FIGS. 1.3, and 100.4 of FIG. 1.4, the photonic material elements 151 in each array $150_{1-x}$ have essentially the same dimensions and essentially the same shape and the arrays $150_{1-x}$ have the same numbers of columns and rows, the same numbers of photonic material elements in the columns and rows, the same pitch between elements in the columns, and the same pitch between elements in the rows. Furthermore, the arrays and, particularly, the photonic material elements of the different arrays are vertically aligned. In these PIC structures 100.1-100.4, the photonic material elements 151 in the arrays $150_{1-x}$ can, however, have either the same material structure (e.g., the same layers with the same thicknesses, etc.) or different material structures (e.g., different layers and/or different thicknesses, etc.).

In the PIC structure 100.5 of FIG. 1.5A-1.5B, the photonic material elements 151 in each array $150_{1-x}$ have essentially the same dimensions and essentially the same shape and the arrays $150_{1-x}$ have the same numbers of columns and rows, the same numbers of photonic material elements in the columns and rows, the same pitch between elements in the columns, and the same pitch between elements in the rows. However, in this case, the arrays $150_{1-x}$ and, particularly, the photonic material elements of the different arrays are offset (i.e., not vertically aligned). As with the previously described PIC structures 100.1-100.4, in the PIC structure 100.5 the photonic material elements 151 in the arrays $150_{1-x}$ can have either the same material structure (e.g., the same layers with the same thicknesses, etc.) or different material structures (e.g., different layers and/or different thicknesses, etc.).

In the PIC structure 100.6 of FIG. 1.6A-1.6B, the photonic material elements 151 in each array $150_{1-x}$ have different dimensions and different shapes (e.g., rectangle and square) and the arrays $150_{1-x}$ have different numbers of columns and rows and different pitches at least between the elements in the rows. As with the previously described PIC structures 100.1-100.5, in the PIC structure 100.6 the photonic material elements 151 in the arrays $150_{1-x}$ can have either the same material structure (e.g., the same layers with the same thicknesses, etc.) or different material structures (e.g., different layers and/or different thicknesses, etc.).

It should be noted that exemplary core materials for the first and second waveguide cores 110, 120, exemplary photonic material layers for the photonic material elements 151, and exemplary cladding materials 105 for surrounding the first waveguide core 110, the second waveguide core 120, and the photonic material elements 151 are discussed in greater detail below.

Referring to FIGS. 2.1A-2.7, the coupler 255 in the PIC structures 200.1-200.7 can include at least one photonic material layer 251. Each photonic material layer 252 can be, for example, a photonic crystal layer (i.e., also referred to as a photonic bandgap material layer) or, alternatively, a photonic metamaterial layer. As mentioned above, a photonic crystal refers to an optical structure in which the refractive index changes periodically in a particular manner that causes a particular impact on the propagation of light signals. The periodic changes in the refractive index in the optical structure can, for example, be due to the use of different material layers within the structure and/or due to the use of a series of different deposition specifications when depositing any one specific material layer during formation of the structure. Additionally, a photonic metamaterial refers to a composite optical structure in which different material layers are arranged in a particular pattern (e.g., in a repeating pattern or some other patterns) that causes a particular impact on the propagation of light signals. Such metamaterials derive their properties from internal microstructures and/or nanostructures (as opposed to chemical composition found in natural materials). Thus, the particular impact on the propagation of light signals may otherwise be unobserved in nature (e.g., unique to the optical structure).

The coupler 255 in the PIC structures 200.1-200.7 can further include, for each photonic material layer 251, a corresponding array $250_{1-x}$ of cladding material elements 252 that extend essentially vertically through the photonic material layer 251 to cladding material 205 above and below the photonic material layer 251.

The cladding material elements 252 in an array $250_{1-x}$ can be patterned structures with dimensions (e.g., length, width, height) in the 10's of microns to the 10's of nanometers (e.g., depending upon the technology node, the thickness of the photonic material layer 251, the desired optical properties, etc.). The cladding material elements 252 in an array $250_{1-x}$ can, for example, all be the same size and the same three-dimensional shape. For example, the cladding material elements 252 in an array $250_{1-x}$ can all be three-dimensional rectangular shapes with essentially the same dimensions, as illustrated in the PIC structure 200.1 of FIGS. 2.1A-2.1E. Also, for example, the cladding material elements 252 in an array $250_{1-x}$ can all be elliptical pillar shapes with the same dimensions, e.g., as shown in the PIC structure 200.2 of FIG. 2.2. Alternatively, the cladding material elements 252 in an array $250_{1-x}$ could all have some other suitable shape (e.g., square pillar, circular pillar, hexagonal pillar, etc.). Alternatively, the cladding material elements 252 in an array $250_{1-x}$ could have some combination of different three-dimensional shapes and/or different sizes.

Additionally, the cladding material elements 252 in an array $250_{1-x}$ of such elements that extend through a photonic material layer 251 can be arranged in columns (e.g., in the Y-direction as illustrated in the layout diagrams), which are essentially perpendicular to and traverse the first end portion 211 and the second end portion 221, and in rows (e.g., in the X-direction as illustrated in the layout diagrams), which are parallel to the first end portion 211 and the second end portion 221. For example, the columns can all have the same number n of cladding material elements 252 with the same pitch between elements and the rows can all have the same number m of cladding material elements 252 with the same pitch between elements (where n=m or where n≠m and where the pitch of the cladding material elements 252 in the columns is either the same as or different from the pitch in the cladding material elements in the rows), as shown in the PIC structure 200.1 of FIG. 2.1A-2.1E, such that the overall shape of the array is essentially rectangular. In this case, the shape of the photonic material layer 251 can similarly have a rectangular shape, as illustrated. Alternatively, at least some of the columns can have different numbers of cladding material elements 252 with the same pitch between elements and/or at least some of the rows can have different numbers of cladding material elements 252 with the same pitch between elements, e.g., see the PIC structure 200.3 of FIG. 2.3 where the columns have the same pitch between elements, where the rows have the same pitch between elements, but where the outermost columns and uppermost and lowermost rows have fewer cladding material elements 252 than the inner columns and rows such that the overall shape of the array has tapered sides. In this case, the shape of the photonic material layer 251 can be patterned into the essentially rectangular shape or, alternatively, can have tapered opposing ends 253 mirroring the shape of the array, e.g., as illustrated in the PIC structure 200.3 of FIG. 2.3. Alternatively, the pitch between elements in some columns and/or the pitch between elements in some rows can be varied, e.g., see the PIC structure 200.4 of FIG. 2.4 where the pitch between elements in the columns is the same but the pitch between elements in the rows decreases progressively from adjacent the first waveguide core 210 to adjacent the second waveguide core 220. Alternatively, the cladding material elements 252 in an array $250_{1-x}$ could be randomly arranged (not shown).

As mentioned above, the coupler 255 includes at least one photonic material layer 251 and an array $250_{1-x}$ of cladding material elements 252 that extend vertically through the photonic material layer 251. Optionally, the coupler 255 can be multi-layered. That is, it can include two or more photonic material layers 251 (each including a corresponding array $250_{1-x}$ of cladding material elements 252 extending therethrough). The photonic material layers 251 can be stacked vertically between the first end portion 211 of the first waveguide core 210 and the second end portion 221 of the second waveguide core 220. They can further be physically separated from the first end portion below, from the second end portion above, and from each other. They can also each be essentially embedded in cladding material 205 (i.e., surrounded by cladding material on the sides, below and above). For purposes of illustration, two photonic material layers 251 are shown in the figures. However, it should be understood that the figures are not intended to be limiting. Alternatively, the coupler 255 in the PIC structures 200.1-200.7 could include any number of one or more photonic material layers 251 (each including a corresponding array of cladding material elements 252 extending therethrough).

In a multi-layered coupler 255, the photonic material layers 251 and the corresponding arrays 250$_{1-x}$ of cladding material elements 252 can be, for example, essentially identical. That is, the photonic material layers 251 can have the same dimensions, can have the same overall shape, and can have the same material structure. Additionally, the corresponding arrays 250$_{1-x}$ of cladding material elements 252 extending therethrough can have the same numbers of columns and rows, can have the same numbers of cladding material elements 252 in the columns and rows, can have the same pitch between elements in the columns, can have the same pitch between elements in the rows, and so on. Furthermore, the cladding material elements 252 in one photonic material layer 251 can be made of different cladding material(s) than the cladding material elements 252 in another photonic material layer. Alternatively, in a multi-layered coupler 255, the photonic material layers 251 and/or the corresponding arrays 250$_{1-x}$ of cladding material elements extending therethrough can be different in some way. That is, the photonic material layers 251 can have different dimensions and/or different shapes and/or different material structures, the cladding material elements 252 could be made of different cladding material(s) and/or the corresponding arrays 250$_{1-x}$ of cladding material elements 252 extending therethrough can have different numbers of columns and/or rows and/or different numbers of cladding material elements in the columns and/or in the rows and/or different pitches between elements in different columns and/or different pitches between elements in different rows and so on.

For example, as illustrated in the PIC structures 200.2 of FIGS. 2.1A-2.1E, 200.2 of FIG. 2.2, 200.3 of FIGS. 2.3, and 200.4 of FIG. 2.4, the photonic material layers 251 in each level of the coupler 255 can have the same dimensions and the same overall shapes and the corresponding arrays 250$_{1-x}$ of cladding material elements 252 extending therethrough can have the same numbers of columns and rows, can have the same numbers of cladding material elements 252 in the columns and rows, can have the same pitch between elements in the columns, can have the same pitch between elements in the rows, and so on. Furthermore, the photonic material layers 251 and the corresponding arrays 250$_{1-x}$ of cladding material elements 252 are vertically aligned. In these PIC structures 200.1-200.4, the photonic material layers 251 can have either the same material structure (e.g., the same layers with the same thicknesses, etc.) or different material structures (e.g., different layers and/or different thicknesses, etc.). Additionally, the cladding material elements 252 of the different arrays 250$_{1-x}$ can also have either the same material structure or different material structures.

In the PIC structure 200.5 of FIG. 2.5A-2.5B, the photonic material layers 251 in each level of the coupler 255 can have the same dimensions and the same overall shapes and the corresponding arrays 250$_{1-x}$ of cladding material elements 252 extending therethrough can have the same numbers of columns and rows, can have the same numbers of cladding material elements 252 in the columns and rows, can have the same pitch between elements in the columns, can have the same pitch between elements in the rows, and so on. However, in this case, the photonic material layers 251 at the different levels and the arrays 250$_{1-x}$ and, particularly, the cladding material elements 252 of the different arrays are offset (i.e., not vertically aligned). As with the previously described PIC structures 200.1-200.4, in the PIC structure 200.5, the photonic material layers 251 can have either the same material structure (e.g., the same layers with the same thicknesses, etc.) or different material structures (e.g., different layers and/or different thicknesses, etc.). Additionally, the cladding material elements 252 of the different arrays 250$_{1-x}$ can also have either the same material structure or different material structures.

In the PIC structure 200.6 of FIG. 2.6A-2.6B, the cladding material elements 252 in each array 250$_{1-x}$ have different dimensions and different shapes (e.g., rectangle and square) and the arrays 250$_{1-x}$ have different numbers of columns and rows and different pitches at least between the elements in the rows. As with the previously described PIC structures 200.1-200.5, in the PIC structure 200.5, the photonic material layers 251 can have either the same material structure (e.g., the same layers with the same thicknesses, etc.) or different material structures (e.g., different layers and/or different thicknesses, etc.). Additionally, the cladding material elements 252 of the different arrays 250$_{1-x}$ can also have either the same material structure or different material structures.

It should be noted that exemplary core materials for the first and second waveguide cores 210, 220, exemplary materials of the photonic material layer(s) 251, and exemplary cladding materials 205 for surrounding the first waveguide core 210, the second waveguide core 220, and the photonic material layer(s) 251 and for forming the cladding material elements 252 are discussed in greater detail below.

Referring again to FIGS. 1.1A-1.7 and FIGS. 2.1A-2.7, the maximum length of the coupler 155, 255 (e.g., in the Y direction as indicated in the layout diagrams) can be approximately equal to the overlap distance between first end portion and the second end portion so that any overlap with the main bodies of the waveguide cores is minimal or non-existent. The maximum width of the coupler 155, 255 (e.g., in the X direction as indicated in the layout diagrams) can range, for example, from approximately equal to the maximum width of the narrowest of the adjacent end portions to approximately equal to or wider than the maximum width of the widest of the adjacent end portions.

Manufacturing of the above-described PIC structures 100.1-100.7, 200.1-200.7 can include manufacturing the first waveguide core 110, 210, the coupler 155, 255, and the second waveguide core 120, 220 in sequential order at different processing levels. Formation of the first waveguide core can include forming a first core material layer on a layer of cladding material 105, 205 (e.g., on the insulator layer 104, 204), patterning (e.g., lithographically patterning and etching) the first core material layer into the desired shape for first waveguide core 110, 210, and forming one or more additional layers of cladding material 105, 205 over the first waveguide core 110, 210. Alternatively, formation of the first waveguide core 110, 210 can include forming a layer of cladding material 105, 205, patterning (e.g., lithographically patterning and etching) a trench with the desired shape for the first waveguide core 110, 210 in the layer of cladding material 105, 205, filling the trench with a first core material layer to form the first waveguide core 110, 210, performing a chemical mechanical polishing (CMP) process to remove any first core material from the top surface of the layer of cladding material outside the trench, and forming one or more additional layers of cladding material 105, 205 over the first waveguide core 110, 210.

Formation of the coupler 155 in the PIC structures 100.1-100.7 can include forming a photonic material layer on a layer of cladding material 105 above the first waveguide core. This photonic material layer can be, for example, a photonic crystal layer or, alternatively, a photonic metamaterial layer. For a photonic crystal layer, multiple different material layers can be formed so that the refractive index of the formed photonic material layer changes periodically in order to achieve some desired impact on light signal propagation. Additionally, or alternatively, for a photonic crystal layer, a series of different deposition specifications can be used when depositing any one specific material layer so that the refractive index of the formed photonic material layer changes periodically in order to achieve some desired impact on light signal propagation. For example, sputtering depositions can be employed to obtain films, such as silicon nitride films, with customizable optical properties. Specifically, during sputtering deposition of silicon nitride, increasing nitrogen flux can result in a larger refractive index and vice versa or the sputtering power can be selectively varied to vary the refractive index. Those skilled in the art will recognize that specifications for sputter deposition of silicon nitride can be varied to achieve refractive indices ranging from 1.6-3.2. Those skilled in the art will recognize that, depending upon the deposition technique used and the material being deposited, some other suitable series of different deposition parameters could be used (e.g., a series of different deposition angles) to achieve periodic changes in the refractive index of one specific material layer. For a photonic metamaterial layer, different material layers can be formed so that they are arranged in a particular pattern (e.g., in a repeating pattern or some other patterns) in order to cause a particular impact on the propagation of light signals. The photonic material layer can be patterned (e.g., lithographically patterned and etched) into an array of discrete photonic material elements 151 aligned above the first end portion 111 of the first waveguide core 110 (see the detailed discussion above regarding the arrangement of the array). The array can subsequently be covered by one or more layers of cladding material 105. Such processing can be repeated for a multi-layer coupler 155. Alternatively, the coupler 155 can be formed by forming a layer of cladding material 105 above the first waveguide core 110. This layer of cladding material 105 can be patterned (e.g., lithographically patterned and etched) with an array of trenches. Photonic material elements 151 can be formed (e.g., using techniques as described above to form photonic crystal elements or photonic metamaterial elements) in the trenches, respectively, and a CMP process can be performed to remove all photonic materials from the top surface of the cladding material layer outside the trenches. The array of photonic material elements 151 can subsequently be covered by one or more layers of cladding material 105. Such processing can be repeated for a multi-layer coupler 155. See the detailed discussion below regarding the exemplary materials that can be employed for the photonic material elements 151 and the cladding material 105 surrounding the photonic material elements.

Formation of the coupler 255 in the PIC structures 200.1-200.7 can include forming a photonic material layer on a layer of cladding material 205 above the first waveguide core. For a photonic crystal layer, multiple different material layers can be formed and/or a series of different deposition specifications can be used when depositing any one specific material layer (e.g., as discussed above) so that the refractive index of the formed photonic material layer changes periodically in order to achieve some desired impact on light signal propagation. For a photonic metamaterial layer, different material layers can be formed so that they are arranged in a particular pattern (e.g., in a repeating pattern or some other patterns) in order to cause a particular impact on the propagation of light signals. In any case, this photonic material layer can be, for example, a photonic crystal layer or, alternatively, a photonic metamaterial layer. The photonic material layer 251 can be patterned (e.g., lithographically patterned and etched) to have a desired overall shape aligned above the first end portion 211 of the first waveguide core 210 and also so that array of openings extend vertically through the photonic material layer 251. Cladding material elements 252 can be formed in the openings, thereby forming an array of cladding material elements (see the detailed discussion above regarding the arrangement of the array). For example, one or more layers of cladding material 205 can be formed over the photonic material layer 251 and in the openings. The cladding material 205 can completely fill the openings, as illustrated. Alternatively, the cladding material 205 could pinch off at the top of the openings prior to completely filling the openings so that the cladding material elements include both cladding material and an air gap. Such processing can be repeated for a multi-layer coupler 255. See the detailed discussion below regarding the exemplary materials that can be employed for the photonic material layer(s) 251 and the cladding material 205 used for the cladding material elements 252 and for surrounding the photonic material layer(s) 251.

Formation of the second waveguide core 120, 220 can proceed in essentially the same manner as formation of the first waveguide core 110, 210. Specifically, a second core material layer can be formed on a layer of cladding material 105, 205 and patterned (e.g., lithographically patterned and etched) into the desired shape for second waveguide core 120, 220 including a second end portion 121, 221 overlaying the coupler 155, 255 and the first end portion 111, 211 of the first waveguide core 110, 210. One or more additional layers of cladding material 105, 205 can then be formed over the second waveguide core 120, 220. Alternatively, formation of the second waveguide core 120, 220 can include forming a layer of cladding material 105, 205, patterning (e.g., lithographically patterning and etching) a trench with the desired shape for the second waveguide core 120, 220 in the layer of cladding material, filling the trench with a second core material layer to form the second waveguide core 120, 220, performing a CMP process to remove any of the second core materials from the top surface of the layer of cladding material outside the trench, and forming one or more additional layers of cladding material 105, 205 over the second waveguide core 120, 220.

Given such processing techniques, in the disclosed embodiments the first waveguide core 110, 210, the second waveguide core 120, 220, and, as applicable, either the photonic material elements 151 of the coupler 155 or the photonic material layer(s) 251 of the coupler 255 can be made of a combination of different relatively large refractive index materials. Furthermore, the layers or portions of the cladding material 105, 205 surrounding each of these components can be made up of the same or different relatively small refractive index material.

For example, the first waveguide core 110, 210 and the second waveguide core 120, 220 can be made of the same or different waveguide core materials.

For example, in some embodiments, the first waveguide core 110, 210 could be a silicon waveguide core (e.g., with a refractive index of 3 or larger), a silicon nitride waveguide core (e.g., an Si3N4 waveguide core with a refractive index of 2.0), or a waveguide core of any other suitable waveguide core material (e.g., polysilicon, silicon germanium, polysilicon germanium, etc.). The second waveguide core 120, 220 could be a silicon nitride waveguide core (e.g., an Si3N4 waveguide core with a refractive index of 2.0) or a waveguide core of any other suitable waveguide core material.

As mentioned above, the photonic material elements 151 of the coupler 155 or the photonic material layer(s) 251 of the coupler 255 (as applicable) could be photonic crystals or photonic metamaterials. The photonic crystals or photonic metamaterials of the photonic material elements 151 of the coupler 155 or of the photonic material layer(s) 251 of the coupler 255 can be made, for example, from relatively large refractive index material(s). Such large refractive index materials can include, but are not limited to, silicon carbon nitride (SiCN), silicon oxynitride (SiON), silicon nitride (SiN), aluminum nitride (AlN), gallium nitride (GaN), alumina (Al2O3) or some other suitable large refractive index material. Additionally, or alternatively, the photonic crystals or photonic metamaterials of the photonic material elements 151 of the coupler 155 or of the photonic material layer(s) 251 of the coupler 255 can be made, for example, from other materials such as a III-V semiconductor or a polymer.

In order to facilitate and control optical signal propagation within the waveguide cores and interlayer waveguide coupling between the waveguide cores, the waveguide cores and the photonic crystals or photonic metamaterials of the photonic material elements 151 of the coupler 155 or of the photonic material layer(s) 251 of the coupler 255 should have different refractive indices than the cladding material that surrounds and separates these features and that, in the case of the coupler 255, forms the cladding material elements 252. Specifically, the refractive index of a given layer or portion of cladding material 105, 205 should be smaller than the refractive index (or the multiple refractive indices) of the waveguide core material or of the photonic crystals or photonic metamaterial it clads. The following is a list of exemplary cladding materials (and refractive index (n) thereof) that could potentially be employed for the layers of cladding material 105, 205 (as well as for the cladding material elements 252 of the coupler 255), depending the refractive indices of the adjacent core materials of the first waveguide core, the second waveguide core, and the photonic crystals or photonic metamaterials of the photonic material elements 151 of the coupler 155 or the photonic material layer(s) 251 of the coupler 255:

(1) HfO2 (Hafnium dioxide), n=2.0754 @1.31 um, n=2.0709 @1.55 um;
(2) ZrO2 (Zirconium dioxide, Zirconia), n=2.1155 @1.31 um, n=2.1103 @1.55 um;
(3) Si3N4, n=~2;
(4) SiON, n=~1.46 to ~2.1;
(5) AlN (Aluminum nitride), n=~2.1 to ~2.4;
(6) TiO2 (Titanium dioxide), n=2.4622 @1.31 um, n=2.4538 @1.55 um;
(7) ZnO (Zinc monoxide), n=1.9318 @1.31 um, n=1.9267 @1.55 um;
(8) Al2O3 (Aluminum oxide), n=1.7503 @1.31 um, n=1.7462 @1.55 um;
(9) MgO (Magnesium oxide), n=1.7178 @1.31 um, n=1.7146 @1.55 um;
(10) SiO2 (Silicon dioxide), n<1.6, n=1.45 @1.31 um;
(11) CaF2 (Calcium fluoride), n=1.4272 @1.31 um, n=1.4260 @1.55 um;
(12) OMCTS (SiCOH) n=1.406 @1.31 um; and
(13) MgF2 (Magnesium fluoride), n=1.3718 @1.31 um, n=1.3705 @1.55 um.

It should be noted that some of the above-mentioned exemplary waveguide core materials and some of the above-mentioned materials that could be employed for the photonic crystals or photonic metamaterials of the photonic material elements 151 of the coupler 155 or for the photonic material layer(s) 251 of the coupler 255 are also mentioned on this list (1)-(13) of exemplary cladding materials. Again, selection of a particular cladding material from this list (or any other suitable cladding material) should be made so that the selected cladding material has a smaller refractive index than the refractive index (or the multiple refractive indices) of the adjacent waveguide core or photonic material elements or layers. Additionally, it should be understood that all portions or layers of the cladding material 105, 205 in the PIC structure 100.1-100.7, 200.1-200.7 (including the cladding material elements 252 in the coupler 255) could include the same compound, which has smaller refractive index than all of the refractive indices of the first waveguide core 110, 210, of the second waveguide core 120, 220 and of the photonic material elements 151 of the coupler 155 or of the photonic material layer(s) 251 of the coupler 255. However, typically, the cladding material 105, 205 in the PIC structure 100.1-100.7, 200.1-200.7 (including the cladding material elements 252 in the coupler 255) will include some combination of two or more different compounds in different portions and/or different layers of the cladding material 105, 205 with each compound have a smaller refractive index than the component it clads. For example, the portion of the cladding material 105 that laterally surround the photonic material elements 151 in the coupler 155 of the PIC structures 100.1-100.2 can be the same or different from the portions of the cladding material 105 above or below those photonic material elements. Similarly, the portion of the cladding material 205 the forms the cladding material elements 252 in the coupler 255 of the PIC structures 200.1-200.2 may be the same or different from the portions of the cladding material 205 above or below the photonic material layer 251 that contains those cladding material elements 252. Furthermore, the portions or layers of the cladding material 105, 205 surrounding the first waveguide core 110, 210 may be different from the portions or layers of the cladding material 105, 205 surrounding the second waveguide core 120, 220.

In any case, in the above-described PIC structures 100.1-100.7, 200.1-200.7, optical signals can pass between the first end portion 111, 211 of the first waveguide core 110, 210 and the second end portion 121, 221 of the second waveguide core 120, 220 aided by the coupler 155, 255. Given the waveguide core and cladding materials and further given the required separation distance between the waveguide cores, specific features of the coupler 155 (including, but not limited to, the number of arrays $150_{1-x}$ and the shapes, dimensions, density, number, materials, etc. of the photonic material elements 151 in each array $150_{1-x}$) and specific features of the coupler 255 (including, but not limited to, the number of photonic material layers 251, the dimensions, shape, and materials of each photonic material layer 251 and the shapes, dimensions, density, number, materials, etc. of the cladding materials elements 252 in the corresponding array $250_{1-x}$ in each photonic material layer 251) can be designed in order to minimize optical signal loss during transmission between the waveguide cores (i.e., to avoid exceed some predetermined maximum threshold amount of signal loss), to facilitate the mode evolution between the first waveguide core 110, 210 and the second waveguide core 120, 220, to mitigate higher-order mode issues (e.g., to suppress higher-order mode via geo optimization of the patterned array $150_{1-x}$, $250_{1-x}$), and to improve through-band performance with flat response.

Figure 4:
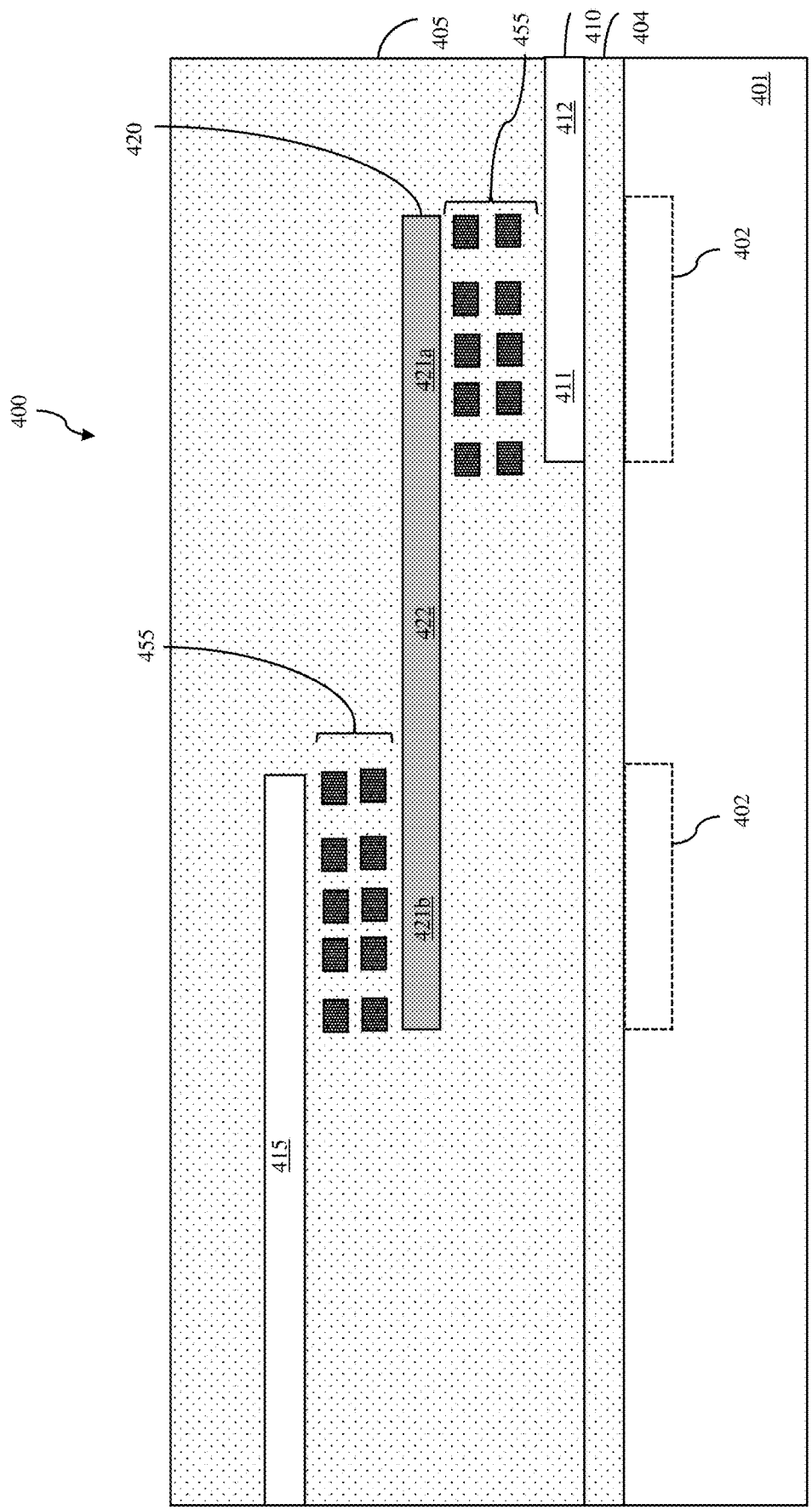

FIGS. 3 and 4 are cross-section diagrams illustrating additional PIC structures 300 and 400, respectively, incorporating multiple couplers 355, 455. Specifically, the PIC structures 300, 400 can include a semiconductor substrate 301, 401 and an optional insulator layer 304, 404) on the semiconductor substrate 301, 401. The PIC structures 300, 400 can further include a first waveguide core 310, 410 with a first main body 312, 412 and a first end portion 311, 411 positioned laterally adjacent to the first main body 312, 412. The PIC structures 300, 400 can further include a second waveguide core 320, 420 with a second main body 322, 422 positioned laterally between opposing second end portions 321a-321b, 421a-421b. The second end portion 321a, 421a of the second waveguide core 320, 420 can overlay, but be physically separated from, the first end portion 311, 411 of the first waveguide core 310, 410. The PIC structures 300, 400 can further include an additional waveguide core 315, 415 with an end portion that either is overlayed by the second end portion 321b of the second waveguide core 320 (see the PIC structure 300) or overlays the second end portion 421b of the second waveguide core 420 (see PIC structure 400). The PIC structures 300, 400 can further a pair of couplers 355, 455 at the second end portions 321a-321b, 421a-421b of the second waveguide core 320, 420 between the second end portion 321a, 421a and the first end portion 311, 411 of the first waveguide core 310, 410 and between the second end portion 321b, 421b and an adjacent end portion of the additional waveguide core 315, 415. The couplers 355, 455 can, for example, be configured essentially the same as any variation of the coupler 155, described in detail above and illustrated in FIGS. 1.1A-1.7. That is, the couplers 355, 455 can include at least one array of photonic material elements embedded in cladding material 305, 405. Alternatively, the couplers 355, 455 could be configured essentially the same as any variation of the coupler 255, described in detail above and illustrated in FIGS. 2.1A-2.7. That is, the couplers 355, 455 can include at least one photonic material layer, which is surrounded by cladding material 305, 405, and an array of cladding material elements that extend vertically through the photonic material layer.

Figure 5A:
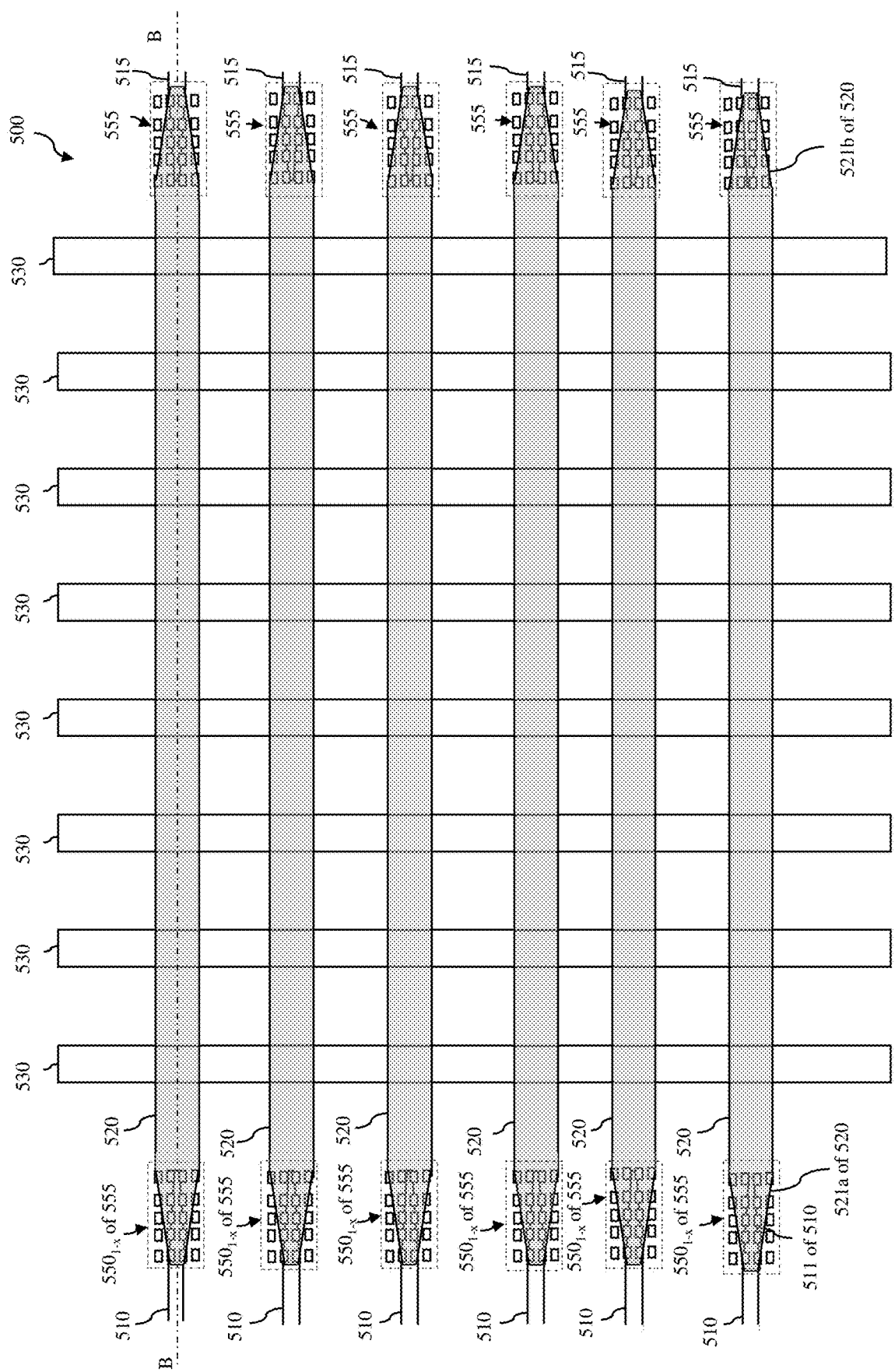
FIG. 5A is a layout diagram and FIG. 5B is a cross-section diagram illustrating a PIC structure including a crossing array implemented using couplers.
Figure 5B:
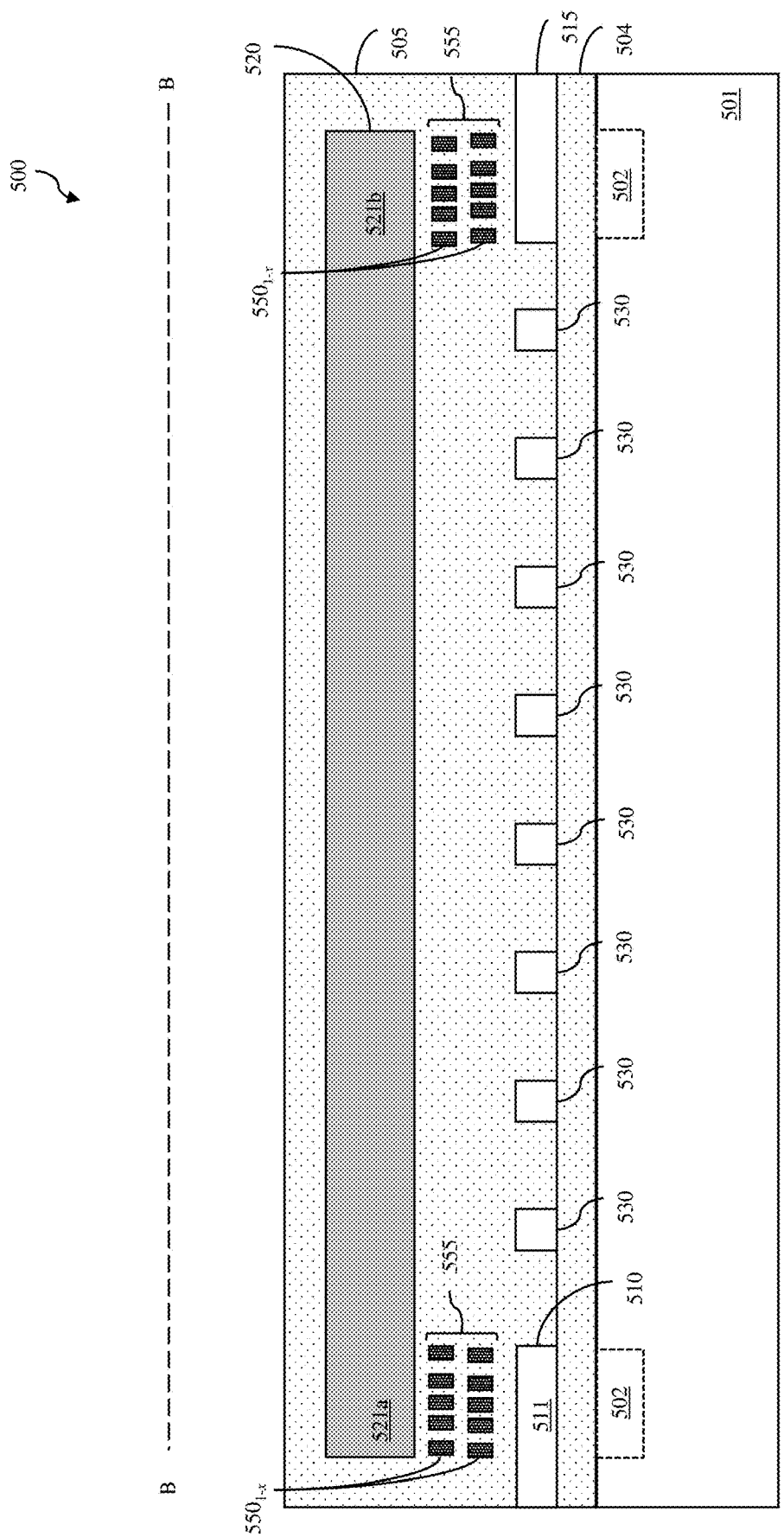

FIG. 5A is a layout diagram and FIG. 5B is a cross-section diagram illustrating yet another embodiment of a PIC structure 500. In this case, the PIC structure 500 includes an on-chip system (e.g., a photonic computing system) that includes a crossing array implemented using the above-described couplers. The PIC structure 500 includes a semiconductor substrate 501 with a first surface and a second surface opposite the first surface. The PIC structure 500 can further include an insulator layer 504 on the second surface of the semiconductor substrate 501.

The PIC structure 500 can further include a group of first waveguide cores 510 at a first height above the substrate (e.g., optionally, above and immediately adjacent to the insulator layer). In this group, the first waveguide cores 510 can have first end portions 511, respectively. The PIC structure 500 can further include a group of second waveguide cores 520 at some level above the first waveguide cores 510. That is, the second waveguide cores 520 can be at a second height, which is greater than the first height, above the substrate 501. In this group, the second waveguide cores 520 can be parallel and can have opposing second end portions 521a-521b with the second end portions 521a overlaying and physically separated from the first end portions 511, respectively. The structure can further include a group of third waveguide cores 530. The group of second waveguide cores 520 can overlay the group of third waveguide cores 530 with the third waveguide cores 530 being oriented essentially perpendicular to the second waveguide cores 520 (e.g., in a crossing array arrangement). For purposes of illustration, the third waveguide cores 530 are shown as being at the same level as the first waveguide cores 510 (i.e., at the first height above the substrate and, thus, separated from the second waveguide cores 530 by the same separation distance). However, it should be understood that, alternatively, the third waveguide cores 530 could be at a third height above the substrate that is different from (e.g., greater or less than) the first height of the first waveguide cores 510. In any case, the third waveguide cores 530 should be below the second waveguide cores 520 and separated therefrom by a sufficient separation distance to avoid optical coupling (i.e., to prevent optical signal transmission between the second waveguide cores 520 and the third waveguide cores 530).

The PIC structure 500 can further include a group of couplers 555 for coupling the first end portions 511 of the first waveguide cores 510 to second end portions 521 of the second waveguide cores 520, respectively. The couplers 555 can, for example, be configured essentially the same as any variation of the coupler 155, described in detail above and illustrated in FIGS. 1.1A-1.7. That is, the couplers 555 can include at least one array of photonic material elements embedded in cladding material 505. Alternatively, the couplers 555 could be configured essentially the same as any variation of the coupler 255, described in detail above and illustrated in FIGS. 2.1A-2.7. That is, the couplers 555 can include at least one photonic material layer, which is surrounded by cladding material 505, and an array of cladding material elements that extend vertically through the photonic material layer. In any case, all of the waveguide cores discussed above (i.e., the first waveguide cores 510, the second waveguide cores 520, the third waveguide cores 530 and the photonic material elements or photonic material layer(s) of the couplers 555) can be surrounded by cladding material 505 (including the insulator layer 504 if the first waveguide cores 510 are above and immediately adjacent thereto).

Optionally, in the PIC structure 500, additional couplers 555 can be employed at the second end portions 521b to further couple the second waveguide cores 520 to additional waveguide cores 515. The additional waveguide cores 515 can be, for example, at some level below the second waveguide cores 520 (e.g., at the same level as the first waveguide cores 510, as illustrated and similar to the PIC structure 300 of FIG. 3 described above). However, it should be understood that the figures are not intended to be limiting. Alternatively, the additional waveguide cores 515 could be below the level of the second waveguide cores 520, but at a different level than the first waveguide cores 510, such that the couplers 555 on either side of the structure require different numbers of layers (e.g., different numbers of stacked arrays of photonic material elements if the couplers 555 are configured in the same manner as the coupler 155 or different numbers of photonic material layers with corresponding arrays of cladding material elements extending therethrough if the couplers are configured in the same manner as the coupler 255). Alternatively, the additional waveguide cores 515 could be above the level of the second waveguide cores 520, similar to the PIC structure 400 of FIG. 4 described above.

Optionally, any of the above-described PIC structures 100.1-100.7, 200.1-200.7, 300, 400, and 500 can further include at least one cavity 102, 202, 302, 402, 502 within the semiconductor substrate 101, 201, 301, 401, 501 adjacent to the second surface (e.g., adjacent to the top surface at the insulator layer 104, 204, 304, 404, 504). Each cavity 102,

202, 302, 402, 502 can be aligned below a corresponding coupling region. For example, a cavity 102, 202, 302, 402, 502 can be aligned below a first end portion 111, 211, 311, 411, 511 of a first waveguide core 110, 210, 310, 410, 510 and, thereby aligned below both the coupler 155, 255, 355, 455, 555 and the second end portion 121, 221, 321, 421, 521 of the second waveguide core 120, 220, 320, 420, 520 overlaying that first end portion. The cavity 102, 202, 302, 402, 502 can be filled with air, with gas, or under vacuum and can be employed to minimize leakage loss through from that coupling region through the semiconductor substrate 101, 201, 301, 401, 501. Various techniques for forming such a localized cavity are well known in the art and, thus, the details have been omitted from this specification in order to allow the reader to focus on the salient aspects of the disclosed embodiments. However, typically such a cavity is formed by etching relatively small holes through an isolation region, through the insulator layer below the isolation region, and into the substrate on opposite sides of the desired location for the cavity, preforming a selective isotropic etch process through holes to form cavities the eventually merge below the desired location, and plugging the holes with an isolation material (e.g., silicon dioxide).

As mentioned above, the coupler(s) 155, 255, 355, 455, 555 in the PIC structures 100.1-100.7, 200.1-200.7, 300, 400, 500 facilitate interlayer waveguide coupling when the separation distance between adjacent overlapping end portions of two waveguide cores is too great to allow optical signals to pass therebetween without exceeding some optimal maximum threshold amount of signal loss. This low-loss signal transmission applies to optical signals in all modes (e.g., in the transverse electric (TE), transverse magnetic (TM) and transverse electromagnetic (TEM) modes). Such couplers 155, 255, 355, 455, 555 can further be used to facilitate the mode evolution between the waveguide cores, to mitigate higher-order mode issues (e.g., to suppress higher-order mode via geo optimization of the patterned array), and to improve through-band performance with flat response. Furthermore, by employing such couplers that allow for interlayer waveguide coupling, the overall footprint of a PIC can be scaled in size.

It should be understood that in the embodiments described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should further be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first waveguide core with a first end portion;
a second waveguide core with a second end portion overlaying and physically separated from the first end portion; and
a coupler,
wherein the first end portion, the coupler, and the second end portion are stacked vertically above a surface of a substrate,
wherein the coupler comprises: an array of photonic material elements arranged in columns and rows within cladding material,
wherein each photonic material element within the array is completely surrounded by the cladding material, and
wherein the array is between and physically separated from the first end portion and the second end portion by the cladding material.

2. The structure of claim 1, wherein the coupler comprises multiple stacked arrays of photonic material elements.

3. The structure of claim 1, wherein the photonic material elements comprise any of photonic crystal elements and photonic metamaterial elements.

4. The structure of claim 1, wherein the photonic material elements each comprises at least two different material layers.

5. The structure of claim 4, wherein the first waveguide core and the second waveguide core each comprise core materials that are different from at least one of the different material layers of the photonic material elements.

6. The structure of claim 1, wherein the first waveguide core and the second waveguide core comprise a same waveguide core material.

7. The structure of claim 1, wherein the first waveguide core and the second waveguide core comprise different waveguide core materials.

8. The structure of claim 1, wherein each column has a same number of the photonic material elements.

9. The structure of claim 1, wherein the first waveguide core has a first main body extending in a first direction away from the first end portion, wherein the second waveguide core has a second main body extending in a second direction different from the first direction away from the second end portion, and wherein outer columns of the photonic material elements in the array adjacent the first main body and the second main body have a lesser number of the photonic material elements than inner columns.

10. The structure of claim 1, further including: an insulator layer on the substrate; and a cavity within the substrate adjacent to the insulator layer, wherein the first end portion, the coupler, and the second end portion are aligned above the cavity.

11. The structure of claim 1, wherein the first waveguide core has a first main body extending in a first direction away from the first end portion, wherein the second waveguide core has a second main body extending in a second direction different from the first direction away from the second end portion, and wherein a width of the first end portion tapers down toward the second main body and a width of the second end portion tapers down toward the first main body.

12. A structure comprising:
a first waveguide core with a first end portion;
a second waveguide core with a second end portion overlaying and physically separated from the first end portion; and
a coupler,
wherein the first waveguide end portion, the coupler, and the second waveguide core are stacked vertically above a surface of a substrate,
wherein the coupler comprises:
a photonic material layer between and physically separated from the first end portion and the second end portion by cladding material layers; and
an array of cladding material elements arranged in columns and rows and extending through the photonic material layer between the cladding material layers.

13. The structure of claim 12, wherein the coupler comprises stacked alternating cladding and photonic material layers and corresponding arrays of the cladding material elements arranged in columns and rows extending through each photonic material layers.

14. The structure of claim 12, wherein the photonic material layer comprises any of a photonic crystal layer and a photonic metamaterial layer.

15. The structure of claim 12, wherein the photonic material layer comprises at least two different material layers.

16. The structure of claim 15, wherein the first waveguide core and the second waveguide core each comprise core materials that are different from at least one of the different material layers of the photonic material layer.

17. The structure of claim 12, wherein each column has a same number of the cladding material elements.

18. The structure of claim 12, wherein the first waveguide core has a first main body extending in a first direction away from the first end portion, wherein the second waveguide core has a second main body extending in a second direction different from the first direction away from the second end portion, and wherein outer columns of the cladding material elements in the array adjacent to the first main body and the second main body have a lesser number of the cladding material elements than inner columns.

19. The structure of claim 12, further including: an insulator layer on the substrate; and a cavity within the substrate adjacent to the insulator layer, wherein the first end portion, the coupler, and the second end portion are aligned above the cavity.

20. A structure comprising:
a group of first waveguide cores, wherein the first waveguide cores have first end portions;
a group of second waveguide cores, wherein the second waveguide cores are parallel, have second end portions overlaying and physically separated from the first end portions, respectively;
a group of third waveguide cores, wherein the group of second waveguide cores overlays the group of third waveguide cores and wherein the third waveguide cores are perpendicular to the second waveguide cores; and
a group of couplers, wherein, above a surface of a substrate, each coupler is stacked vertically between and physically separated from a first end portion of a first waveguide core and a second end portion of a second waveguide core and wherein each coupler comprises an array of elements arranged in columns and rows and comprising one of:
photonic material elements within cladding material, wherein the photonic material elements comprise any of photonic crystal elements and photonic metamaterial elements; and
cladding material elements extending vertically through a photonic material layer stacked vertically between cladding material layers, wherein the photonic material layer comprises any of a photonic crystal layer and a photonic metamaterial layer.

* * * * *